US010972782B2

(12) United States Patent
Nakajima

(10) Patent No.: US 10,972,782 B2
(45) Date of Patent: Apr. 6, 2021

(54) COMMUNICATION APPARATUS, CONTROL METHOD, AND RECORDING MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/357,051

(22) Filed: Mar. 18, 2019

(65) Prior Publication Data

US 2019/0297373 A1 Sep. 26, 2019

(30) Foreign Application Priority Data

Mar. 23, 2018 (JP) .............................. JP2018-056801

(51) Int. Cl.
| | |
|---|---|
| *H04N 21/488* | (2011.01) |
| *H04N 21/43* | (2011.01) |
| *H04N 21/472* | (2011.01) |
| *H04N 21/4363* | (2011.01) |

(52) U.S. Cl.
CPC ... *H04N 21/4302* (2013.01); *H04N 21/43637* (2013.01); *H04N 21/47217* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 2014/0362293 | A1 | 12/2014 | Bakar et al. | |
| 2015/0067588 | A1* | 3/2015 | Shim | G06F 3/0481 715/790 |
| 2015/0243156 | A1* | 8/2015 | Itoh | H04W 4/00 340/539.11 |
| 2016/0117268 | A1* | 4/2016 | Griffin | G06F 13/102 710/10 |

* cited by examiner

*Primary Examiner* — Eileen M Adams
(74) *Attorney, Agent, or Firm* — Canon U.S.A., Inc., IP Division

(57) ABSTRACT

A communication apparatus is provided which acquires content held by an external apparatus based on information related to the content that is received from another communication apparatus and plays back the content. The communication apparatus further receives playback control information about the content from the other communication apparatus. Upon detecting a disconnection of a communication path between the communication apparatus and the other communication apparatus, the communication apparatus performs control in such a manner that a notification based on the disconnection of the communication path is issued to a user.

20 Claims, 7 Drawing Sheets

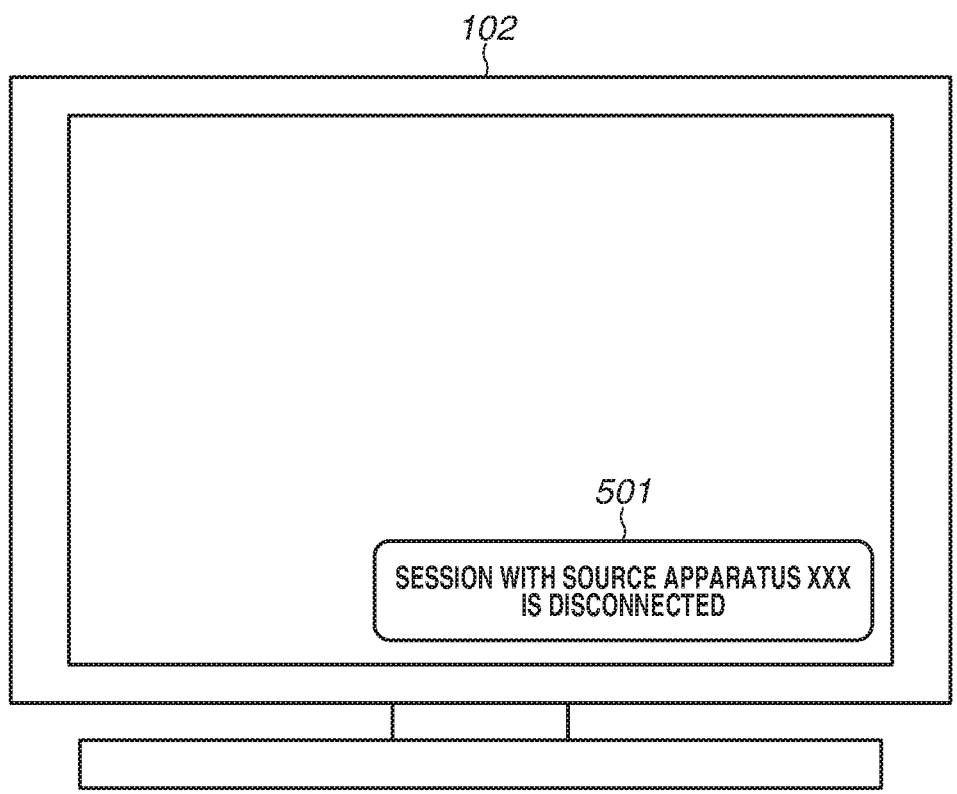

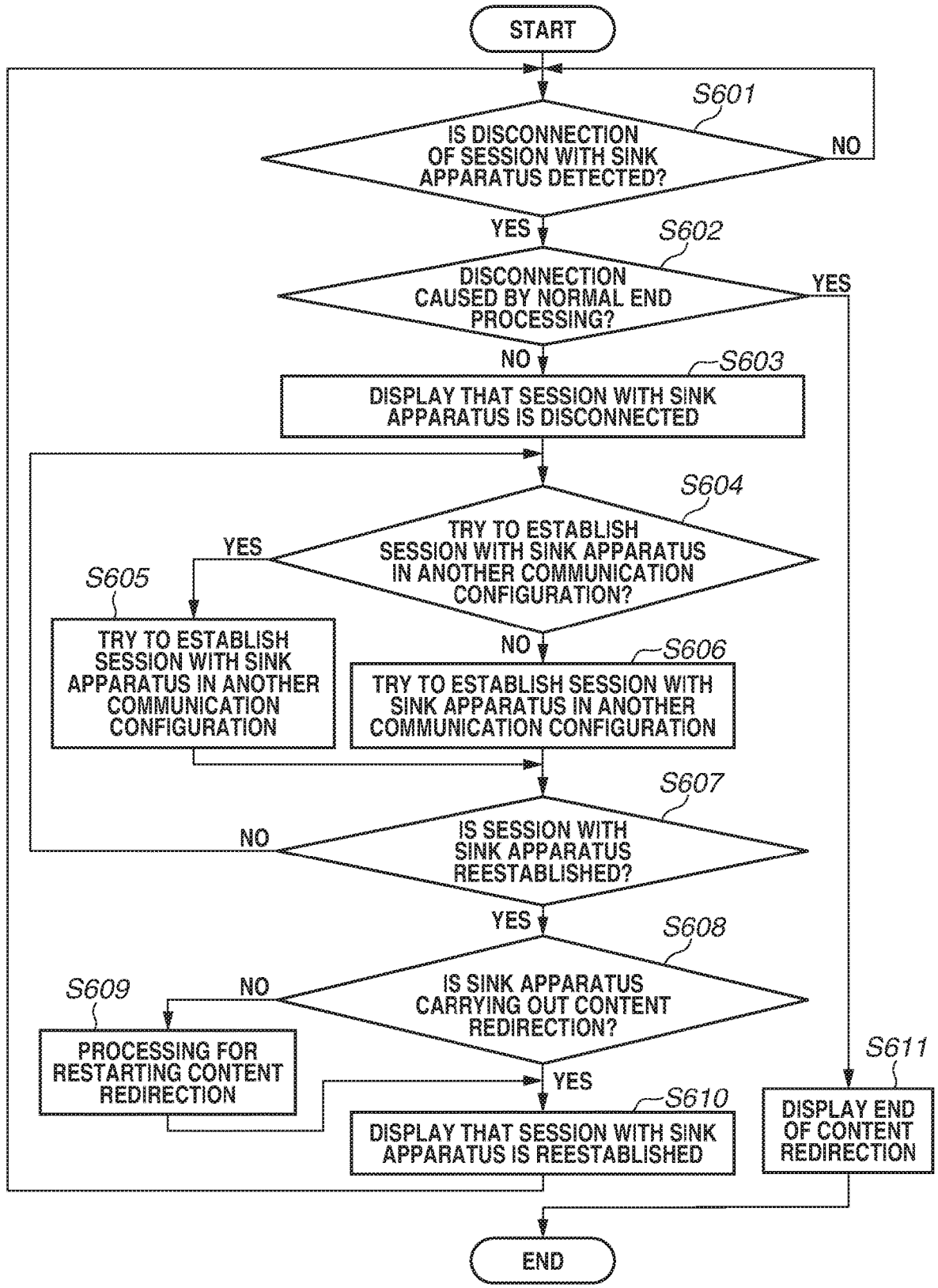

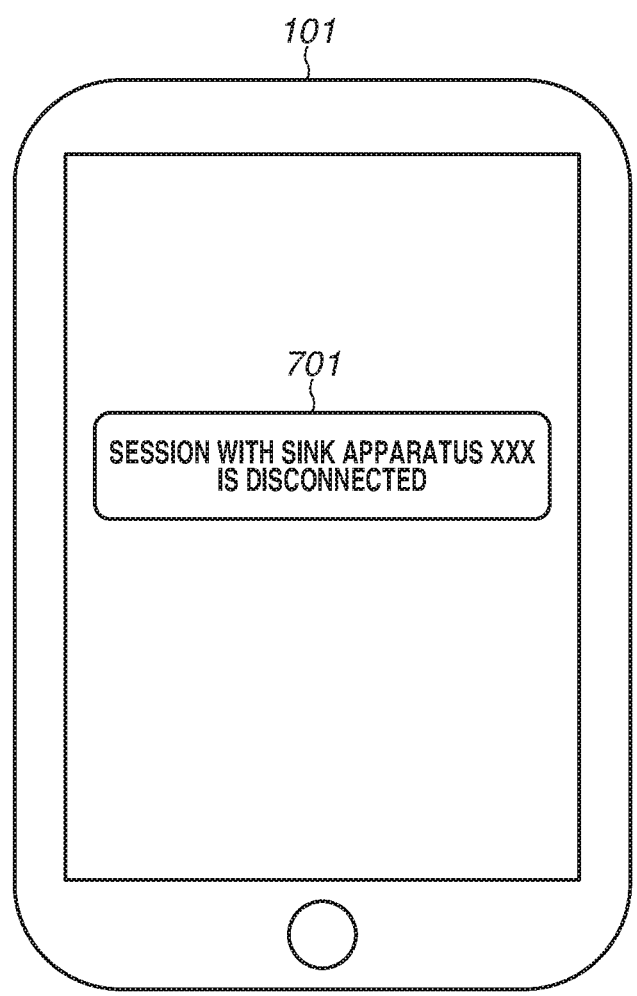

COMMUNICATION APPARATUS, CONTROL METHOD, AND RECORDING MEDIUM

BACKGROUND

Field

The present disclosure relates to communication between a communication apparatus and another communication apparatus.

Description of the Related Art

In recent years, a communication apparatus has been developed having a function of receiving information about content held by an external apparatus from another communication apparatus, acquiring the content from the external apparatus based on the received information, and playing back the content.

For example, in a case where the communication apparatus is a television and the other communication apparatus is a smart-phone, the television receives a Uniform Resource Locator (URL) or the like of the content as the information about the content from the smart-phone. The television acquires the content from a cloud server or the like, the cloud server or the like corresponding to the external apparatus, based on the received URL, and plays back the content. The content played back by the television can be, for example, a movie or music.

United States Patent Application Publication No. 2014/0362293 discusses that, when playing back the content, after acquiring the content from the external apparatus based on the information received from the other communication apparatus, the communication apparatus controls the playback of the content based on playback control information received from the other communication apparatus via wireless communication.

In United States Patent Application Publication No. 2014/0362293, the communication apparatus, which acquires the content from the external apparatus based on the information about the content received from another communication apparatus and plays back the content, can receive the playback control information regarding the playback of the content from the other communication apparatus and control the playback of the content based on the received playback control information. The communication apparatus receives such playback control information via a session between the communication apparatus and the other communication apparatus, and establishes such a session via a wireless communication between the communication apparatus and the other communication apparatus. However, when the session between the communication apparatus and the other communication apparatus is disconnected, the communication apparatus may be unable to receive the playback control information. Further, the communication apparatus may also be unable to receive the playback control information when the wireless communication is disconnected between the communication apparatus and the other communication apparatus. In some situations, however, when a path of the communication between the other communication apparatus and the communication apparatus is disconnected, the user may not be aware that this disconnecting occurred. (The "path of the communication" with the other communication apparatus can include at least one of a session and a wireless communication between the communication apparatus and the other communication apparatus.) Therefore, a situation can arise where the user does not know that the playback control information regarding the playback of the content is unable to be received from the other communication apparatus even though the path of the communication between the other communication apparatus and the communication apparatus is disconnected.

SUMMARY

Various embodiments of the present disclosure enable a communication apparatus that receives playback control information from another communication apparatus via a communication path to perform control in such a manner that a notification based on a disconnection of the communication path is issued to the user in a case where the disconnection of the communication path is detected. Such features can improve convenience to a user.

According to various embodiments of the present disclosure, a communication apparatus includes a first reception unit configured to receive, from a first other communication apparatus, information related to content held by an external apparatus, an acquisition unit configured to acquire the content from the external apparatus based on the related information received by the first reception unit, a playback unit configured to play back the content acquired by the acquisition unit, a second reception unit configured to receive playback control information for controlling the playback of the content from the first other communication apparatus via a communication path between the communication apparatus and the first other communication apparatus in a case where the content is being played back by the playback unit, a detection unit configured to detect a disconnection of the communication path in a case where the content is being played back by the playback unit, and a control unit configured to perform control in such a manner that a notification based on the disconnection of the communication path is issued to a user based on the detection of the disconnection of the communication path by the detection unit.

Further features will become apparent from the following description of exemplary embodiments with reference to the attached drawings.

BRIEF DESCRIPTION OF THE DRAWINGS

FIG. 5 illustrates one example of a display screen displayed when the communication apparatus carries out the content redirection and detects a disconnection of the session with the communication apparatus according to one embodiment.

FIG. 6 is a flowchart illustrating processing performed when the communication apparatus carries out the content redirection and establishes the session with the communication apparatus according to one embodiment.

FIG. 7 illustrates one example of a display screen displayed when the communication apparatus carries out the content redirection and detects the disconnection of the session with the communication apparatus according to one embodiment.

DESCRIPTION OF THE EMBODIMENTS

In the following description, an exemplary embodiment will be described in detail with reference to the accompanying drawings. A configuration that will be described in the following exemplary embodiment is merely one example, and embodiments of the present disclosure are not limited to the illustrated configuration.

Figure 1:
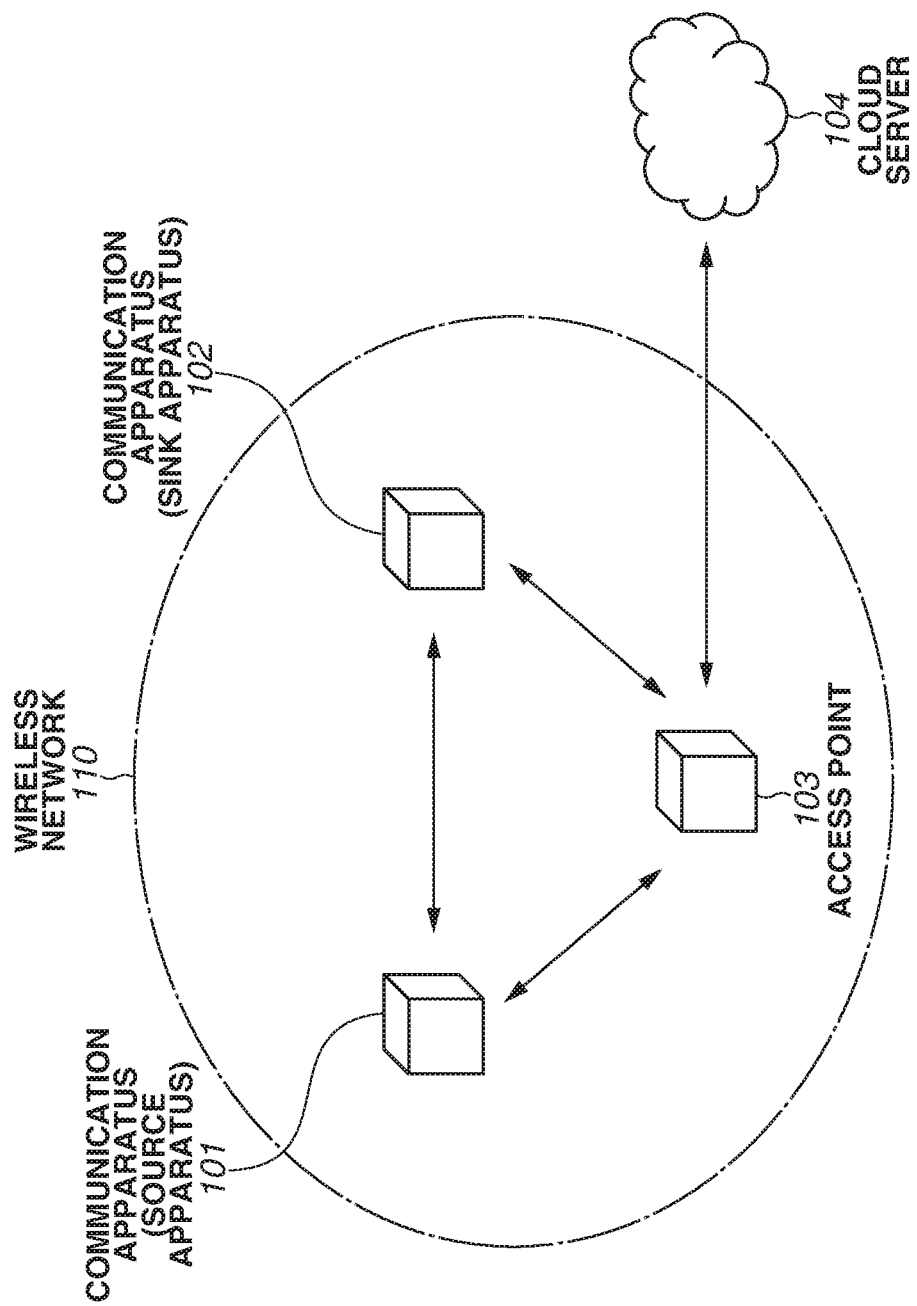
FIG. 1 illustrates a network configuration of a network that a communication apparatus participates in according to one embodiment.

FIG. 1 illustrates a network configuration of a network that a communication apparatus 101 according to the present exemplary embodiment participates in. In a network 110 illustrated in FIG. 1, each apparatus carries out communication according to, for example, a wireless communication method in compliance with the Institute of Electrical and Electronics Engineers (IEEE) 802.11 series standards.

The communication apparatus 101 can communicate with a communication apparatus 102 wirelessly in compliance with the Wireless Fidelity (Wi-Fi) Direct standard. In this case, the communication apparatus 101 and the communication apparatus 102 communicate with each other wirelessly directly without intervention of an access point (AP) 103. Further, the communication apparatus 101 can also communicate with the communication apparatus 102 wirelessly via the AP 103 in an infrastructure network in compliance with the IEEE 802.11 series standards.

In the network 110, each apparatus may also use wireless communication in compliance with another wireless communication method, such as Bluetooth (registered trademark), near-field communication (NFC), ultra-wideband (UWB), ZigBee, or Multi Band Orthogonal Frequency-Division Multiplexing (OFDM) Alliance (MBOA), in addition to the wireless communication in compliance with the IEEE 802.11 series standards. UWB includes wireless universal serial bus (USB), wireless 1394, WiNET, and the like. Alternatively, each apparatus in the network 110 may also use a communication method in compliance with a wired communication method such as a wired local area network (LAN).

In the present exemplary embodiment, the communication apparatus 101 and the communication apparatus 102 carry out mirroring in compliance with, for example, the Wi-Fi Miracast standard therebetween. The communication apparatus 101 (a transmission apparatus) complies with the Wi-Fi Miracast standard, and shares with the communication apparatus 102 (a reception apparatus) a screen and audio that the communication apparatus 101 is displaying and playing back. More specifically, the transmission apparatus transmits image data and audio data to the reception apparatus via the network 110 as information about the screen and the audio that the transmission apparatus is displaying and playing back, thereby enabling the displayed screen and the played-back audio to be shared between the transmission apparatus and the reception apparatus. This is called the mirroring. The communication apparatus 101 plays a role as a source apparatus that transmits at least one of the screen and the audio that the apparatus itself is displaying and playing back in the Wi-Fi Miracast standard. The communication apparatus 102 plays a role as a sink apparatus that receives and plays back the screen and the audio transmitted from the source apparatus in the Wi-Fi Miracast standard. When the communication apparatus 101 and the communication apparatus 102 carry out the mirroring therebetween, the screen and the audio that the communication apparatus 101 is displaying and playing back are shared between the communication apparatus 101 and the communication apparatus 102.

The communication apparatus 101 may carry out the mirroring via the infrastructure network in addition to the mirroring via the network in compliance with the Wi-Fi Direct standard. The same also applies to the communication apparatus 102.

The mirroring will be described referring to an example in which the communication apparatus 101 and the communication apparatus 102 carry out the mirroring therebetween via, for example, the network in compliance with the Wi-Fi Direct standard with the communication apparatus 101 serving as the source apparatus and the communication apparatus 102 serving as the sink apparatus. In the mirroring via the network in compliance with the Wi-Fi Direct standard, the source apparatus directly transmits (streams) a stream of the image data and the audio data to the sink apparatus via the network as the information about the screen and the audio that the source apparatus is displaying and playing back. In the present exemplary embodiment, the image data is assumed to be data generated by coding the screen that the source apparatus is displaying, and the audio data is assumed to be data generated by coding the audio that the source apparatus is playing back. Then, the sink apparatus is assumed to receive the stream of the image data and the audio data, and play back them in synchronization with the source apparatus. In other words, in the present exemplary embodiment, the source apparatus and the sink apparatus that carry out the mirroring therebetween are assumed to share the screen and the audio that the source apparatus is displaying and playing back.

Additionally, the mirroring will be described referring to an example in which the communication apparatus 101 (the source apparatus) and the communication apparatus 102 (the sink apparatus) carry out the mirroring therebetween via the infrastructure network. In the mirroring via the infrastructure network, the source apparatus transmits a stream of the image data and the audio data to the sink apparatus via the AP 103. The sink apparatus receives the stream of the image data and the audio data via the AP 103, and plays back them in synchronization with the source apparatus.

Further, the communication apparatus 101 and the communication apparatus 102 carry out content redirection via the network in compliance with the Wi-Fi Direct standard or the infrastructure network instead of or in addition to the mirroring. In the content redirection, the communication apparatus 101 causes the communication apparatus 102 to acquire data from an external apparatus other than the communication apparatus 101, and causes the communication apparatus 102 to play back the data. Now, the external apparatus means, for example, a cloud server 104. At this time, the communication apparatus 101 transmits to the communication apparatus 102 information required to cause the communication apparatus 102 to acquire the data from the external apparatus. The data acquired by the communication apparatus 102 is, for example, a content, and contains any one of the image data, the audio data, moving image data, and video data. The video data refers to data containing both the audio data and the moving image data. Besides them, the data acquired by the communication apparatus 102 may contain at least any one of software data for playing back these pieces of data, graphical user interface (GUI) data, and metadata.

The information that the communication apparatus 101 transmits to the communication apparatus 102 is information related to the content placed in the external apparatus. The information related to the content is information such as an identifier for identifying the content placed in the external apparatus, a service name, information about whereabouts of the content (a Uniform Resource Identifier (URI) or a Uniform Resource Locator (URL)), and a playback start time (an offset). The received information related to the content may be a part of these kinds of information. The identifier of the content refers to an identifier for uniquely determining the content. Further, the information about the whereabouts of the content refers to information indicating a storage location where the content is stored.

Specific examples of the communication apparatus 101 include a tablet, a smart-phone, a personal computer (PC), a mobile phone, a camera, and a video camera, but the communication apparatus 101 is not limited to them. The communication apparatus 101 may be any communication apparatus as long as it can transmit the information related to the content held by the external apparatus to the other communication apparatus, thereby enabling the other communication apparatus to acquire and play back the content.

Specific examples of the communication apparatus 102 include a tablet, a smart-phone, a PC, a mobile phone, a television, a television adapter, a set-top box, and a head mounted display. Furthermore, other specific examples of the communication apparatus 102 include a projector, a display, and a car navigation apparatus, but the communication apparatus 102 is not limited to them. The communication apparatus 102 may be any communication apparatus as long as it can acquire the content from the external apparatus based on the related information received from the communication apparatus 101 and play back the content.

Further, the communication apparatus 101 and the communication apparatus 102 may carry out direct streaming via the network in compliance with the Wi-Fi Direct standard or the infrastructure network in addition to the content redirection. In the direct streaming, the communication apparatus 101 transmits data stored in the communication apparatus 101 to the communication apparatus 102, and the communication apparatus 102 receives and plays back the data. In this case, the communication apparatus 101 can transmit the data to the communication apparatus 102 while maintaining a coding method currently applied to the data, without decoding and then re-coding the data. Now, the data received by the communication apparatus 102 is, for example, the content.

When the communication apparatus 101 and the communication apparatus 102 are carrying out the content redirection, the communication apparatus 101 can control the playback of the content that is being played back by the communication apparatus 102 by transmitting playback control information based on an input user operation to the communication apparatus 102. For example, suppose that the communication apparatus 101 and the communication apparatus 102 carry out the content redirection and the communication apparatus 102 is playing back the content. For example, when the user inputs a user operation for instructing the communication apparatus 101 to pause the playback of the content to the communication apparatus 101, playback control information for pausing the playback of the content is transmitted from the communication apparatus 101 to the communication apparatus 102. Upon receiving the playback control information, the communication apparatus 102 pauses the playback of the content. In this manner, when the communication apparatus 101 and the communication apparatus 102 are carrying out the content redirection, the user can control the playback of the content that is being played back by the communication apparatus 102 with use of the communication apparatus 101 as if the communication apparatus 101 is a remote controller. The communication apparatus 101 may transmit playback control information containing an instruction for playback, a stop, fast-forward, rewind, and playback starting from a playback time specified by the user, or the like besides the pause as the playback control information about the content. Further, the communication apparatus 101 may also transmit playback control information containing an instruction for a start of playback of a next content, a volume adjustment, an adjustment of a playback speed, whether to display or hide subtitles, a change in a language, or the like as the playback control information about the content. When the communication apparatus 101 and the communication apparatus 102 are carrying out the content redirection via the network in compliance with the Wi-Fi Direct standard, the communication apparatus 101 transmits the playback control information via the network in compliance with the Wi-Fi Direct standard. More specifically, the communication apparatus 101 establishes a session with the communication apparatus 102 via the network in compliance with the Wi-Fi Direct standard, and transmits the playback control information via the established session. On the other hand, when the communication apparatus 101 is carrying out the content redirection via the infrastructure network, the communication apparatus 101 transmits the playback control information via the infrastructure network. More specifically, the communication apparatus 101 establishes a session with the communication apparatus 102 via the infrastructure network, and transmits the playback control information via the established session.

FIG. 1 has been described assuming that the Wi-Fi Miracast standard is employed as the communication method by which the communication apparatus 101 carries out the mirroring. However, the employed communication method is not limited to the Wi-Fi Miracast standard, and the communication apparatus 101 may employ another communication method such as Intel Wireless Display (WiDi) or Wireless High Definition (HD). More specifically, the communication method may be any communication method as long as it enables the communication apparatus 101 to carry out the wireless communication corresponding to at least any one of the above-described mirroring, content redirection, and direct streaming. Further, in the Wi-Fi Miracast standard, the communication apparatus 101 carries out the mirroring via the network in compliance with the Wi-Fi Direct standard or the infrastructure network. The communication apparatus 101 can also establish an application server platform (ASP) session via the network with the communication apparatus 102 that the communication apparatus 101 is supposed to carry out the mirroring with, and then carry out the mirroring via the established ASP session.

Figure 2:
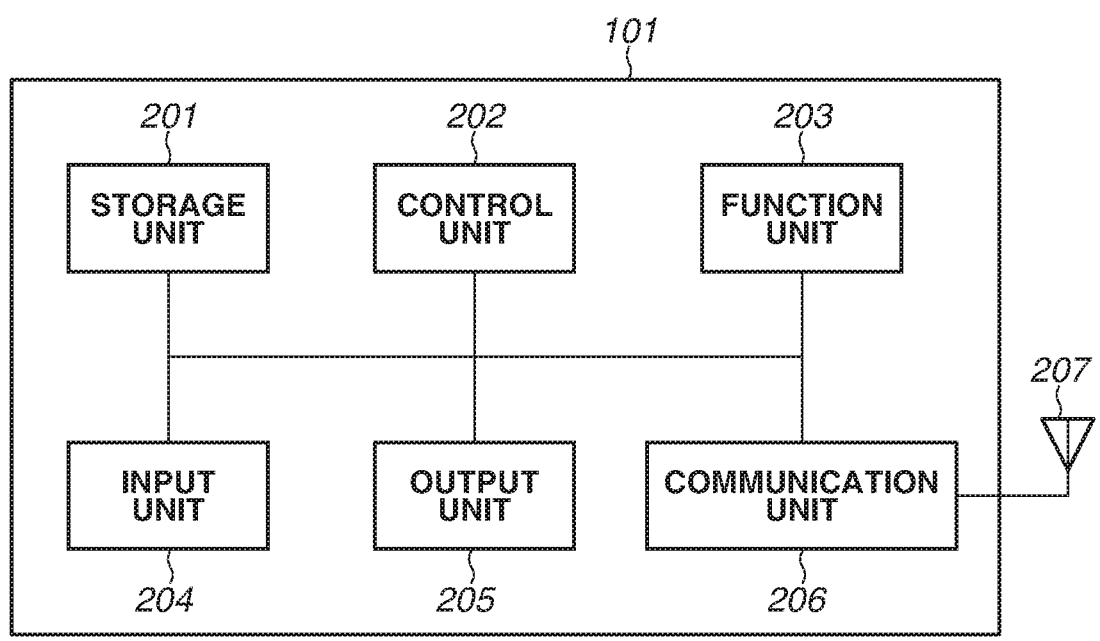
FIG. 2 illustrates a hardware configuration of the communication apparatus according to one embodiment.

FIG. 2 illustrates a hardware configuration of the communication apparatus 101.

The communication apparatus 101 includes a storage unit 201, a control unit 202, a function unit 203, an input unit 204, an output unit 205, a communication unit 206, and an antenna 207.

The storage unit 201 includes one or more memories such as a read only memory (ROM) and/or a random access memory (RAM), and stores therein a computer program for performing various kinds of operations that will be described below and various kinds of information such as communication parameters for the wireless communication.

Examples usable as the storage unit 201 include storage media such as a flexible disk, a hard disk, an optical disk, a magneto-optical disk, a compact disk (CD)-ROM, a CD-recordable (R), a magnetic tape, a nonvolatile memory card, and a digital versatile disk (DVD), besides the memory such as the ROM and the RAM. Furthermore, the storage unit 201 may include a plurality of memories.

The control unit 202 includes one or more processors such as a central processing unit (CPU) and a micro processing unit (MPU), and controls the entire communication apparatus 101 by executing the computer program stored in the storage unit 201. The CPU and the MPU are function as a computer. The control unit 202 may be configured to control the entire communication apparatus 101 based on a cooperation between the computer program stored in the storage unit 201 and an operating system (OS). The control unit 202 may include a plurality of processors of a multi-core processor and the like, and be configured to control the entire communication apparatus 101 by the plurality of processors.

The control unit 202 realizes a mirroring function and a content redirection function implemented as the source apparatus by executing the computer program stored in the storage unit 201. The mirroring function implemented as the source apparatus refers to a function of transmitting, to the sink apparatus, the image data generated by capturing and coding the screen that the apparatus itself is displaying and the audio data generated by coding the audio that the apparatus itself is playing back. The content redirection function implemented as the source apparatus refers to a function of transmitting, to the sink apparatus, the information necessary for the sink apparatus to acquire the content to be played back by the sink apparatus from the external apparatus other than the source apparatus. Further, as the content redirection function implemented as the source apparatus, the communication apparatus 101 can transmit to the sink apparatus a playback control signal for controlling the playback of the content that is being played back by the sink apparatus.

Further, the control unit 202 performs predetermined processing such as imaging and browsing of the content by controlling the function unit 203. The function unit 203 is hardware that enables the communication apparatus 101 to perform the predetermined processing. For example, in the case where the communication apparatus 101 is a camera, the function unit 203 is an imaging unit, and performs imaging processing. At this time, the communication apparatus 101 can carry out the mirroring by displaying data generated by the imaging unit on a screen with use of the output unit 205, which will be described below, and transmitting the data to another communication apparatus with use of the mirroring function of the control unit 202. Alternatively, the communication apparatus 101 may carry out the mirroring in a similar manner by displaying the data stored in the storage unit 201 of the communication apparatus 101 on the screen with use of the output unit 205.

The input unit 204 receives various kinds of operations from the user. The output unit 205 presents various kinds of outputs to the user via a monitor screen, a speaker, or the like. Now, the output by the output unit 205 may be a display on the screen, an audio output by the speaker, an output of a vibration, and/or the like. The monitor screen on which the output unit 205 presents the output is a monitor screen provided for the communication apparatus 101. Alternatively, this monitor screen may be a monitor screen provided for another communication apparatus connected to the communication apparatus 101. The communication apparatus 101 may be configured to realize both the input unit 204 and the output unit 205 as one module, like a touch panel. Each of the input unit 204 and the output unit 205 may be a device different from the communication apparatus 101. Further, the output unit 205 realizes a function as a notification unit that notifies the user by providing the display on the screen, the audio output by the speaker, the output of the vibration, and/or the like.

The communication unit 206 controls the wireless communication in compliance with the IEEE 802.11 series, controls the wired communication of the wired LAN or the like, and controls Internet Protocol (IP) communication. Further, the communication unit 206 controls the antenna 207 to transmit and receive a wireless signal for the wireless communication. The communication apparatus 101 communicates the contents such as image data, document data, and video data with the communication apparatus 102 via the communication unit 206.

The communication apparatus 102 has a similar hardware configuration to the communication apparatus 101. The communication apparatus 102 also includes the storage unit 201, the function unit 203, the input unit 204, the output unit 205, the communication unit 206, and the antenna 207, and they are similar to those of the communication apparatus 101 and therefore descriptions thereof will be omitted here. The control unit 202 is also similar to the control unit 202 of the communication apparatus 101, but differences therefrom will be briefly described now.

The control unit 202 of the communication apparatus 102 realizes a mirroring function and a content redirection function implemented as the sink apparatus by executing the computer program stored in the storage unit 201. Now, the mirroring function implemented as the sink apparatus refers to a function of receiving, decoding, and playing back the image data generated by capturing and coding the screen that the source apparatus is displaying and the audio data generated by coding the audio that the source apparatus is playing back. The content redirection function implemented as the sink apparatus refers to a function of acquiring the content desired to be played back from the external apparatus other than the source apparatus based on the information transmitted from the source apparatus, and playing back the acquired content. Further, as the content redirection function implemented as the sink apparatus, the communication apparatus 102 can control the playback of the content that the apparatus itself is performing, based on the playback control information received from the source apparatus.

The communication apparatus 101 and the communication apparatus 102 can perform both the display of the image and the playback of the audio. However, both the communication apparatus 101 and the communication apparatus 102 may be apparatuses capable of performing only any one of the display of the image and the playback of the audio.

Figure 3:
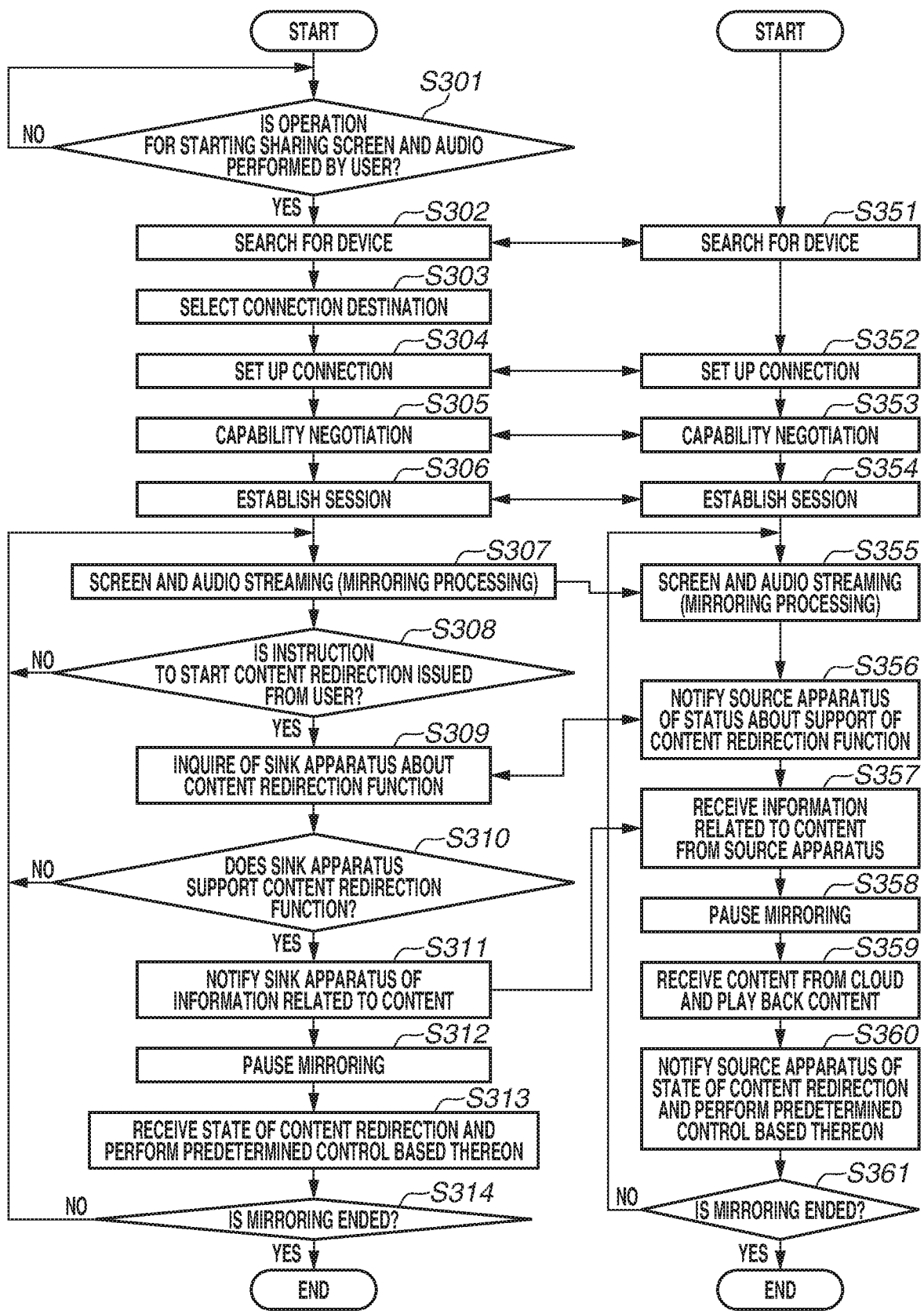
FIG. 3 is a flowchart illustrating processing performed when the communication apparatus and a communication apparatus carry out content redirection according to one embodiment.

FIG. 3 is a flowchart illustrating processing performed when the communication apparatus 101 and the communication apparatus 102 carry out the content redirection. Step S301 to step S314 are a flowchart of processing realized by the control unit 202 reading out the computer program stored in the storage unit 201 and executing the computer program when the communication apparatus 101 carries out the content redirection. Further, step S351 to step S361 are a flowchart of processing realized by the control unit 202 reading out the computer program stored in the storage unit 201 and executing the computer program when the communication apparatus 102 carries out the content redirection.

At least a part of the flowchart illustrated in FIG. 3 may be realized by hardware. In the case where a part of the flowchart illustrated in FIG. 3 is realized by hardware, this can be achieved by, for example, automatically generating a dedicated circuit on a field-programmable gate array (FPGA) from a computer program for realizing each step by using a predetermined compiler. Alternatively, the present exemplary embodiment may be configured in such a manner that a part of the flowchart illustrated in FIG. 3 is realized by forming as hardware a gate array circuit in a similar manner to the FPGA. Alternatively, the present exemplary embodiment may be configured in such a manner that a part of the flowchart illustrated in FIG. 3 is realized by an application specific integrated circuit (ASIC).

Step S301 to step S314 in the present flowchart are started according to a power-on of the communication apparatus 101. The present flowchart may be set in such a manner that step S301 to step 314 in the present flowchart are started according to a startup of a predetermined application on the communication apparatus 101. Further, step S351 to step S361 in the present flowchart are started according to a power-on of the communication apparatus 102. The present flowchart may be set in such a manner that step S351 to step 361 in the present flowchart are started according to a startup of a predetermined application on the communication apparatus 102.

First, in step S301, the control unit 202 of the communication apparatus 101 determines whether an operation for starting sharing the screen and the audio is performed by the user via the input unit 204. The operation for starting sharing the screen and the audio is pressing of a control button for starting sharing the screen and the audio by the user. The start operation is not limited thereto, and the control unit 202 of the communication apparatus 101 may handle a user operation such as a predetermined keyboard operation or mouse operation, a touch operation, or a joystick operation as the start operation. Alternatively, the control unit 202 of the communication apparatus 101 may handle a user operation such as a predetermined gesture, pressing of a control button on a remote controller, a start of a playback of a predetermined content, or a startup of a predetermined application as the start operation. If the operation for starting sharing the screen and the audio is determined not to be performed (NO in step S301), the control unit 202 of the communication apparatus 101 performs the process of step S301 again. On the other hand, if the operation for starting sharing the screen and the audio is determined to be performed (YES in step S301), the control unit 202 of the communication apparatus 101 performs a process of step S302.

Next, a device search is conducted between the communication apparatus 101 and the communication apparatus 102. The communication apparatus 101 and the communication apparatus 102 search for the device to carry out the mirroring with via the wireless communication in compliance with the Wi-Fi Direct standard. Alternatively, the communication apparatus 101 and the communication apparatus 102 may search for the device to carry out the mirroring with via the infrastructure network.

In the present flowchart, the communication apparatus 101 and the communication apparatus 102 search for the device to carry out the mirroring with via the wireless communication in compliance with the Wi-Fi Direct standard (step S302 and step S351). More specifically, first, the control unit 202 of the communication apparatus 101 transmits a Probe Request in compliance with the IEEE 802.11 series standards as a device discovery request, and the control unit 202 of the communication apparatus 102 transmits a Probe Response as a response thereto. As a result, the communication apparatus 101 and the communication apparatus 102 discover each other. The apparatuses that transmit the Probe Request and Response may be exchanged for each other.

The control unit 202 of the communication apparatus 101 displays a list of discovered devices on the monitor screen prepared as the output unit 205. The user selects a device to share the screen and the audio with from the list of devices displayed on the monitor screen of the communication apparatus 101. In step S303, the control unit 202 of the communication apparatus 101 selects the device selected by the user as a connection partner apparatus to share the screen and the audio with. The selection of the connection partner apparatus in the present step may be made by the communication apparatus 101 based on a history of a device with which the communication apparatus 101 has ever shared the screen and the audio previously. More specifically, if there is a device with which the communication apparatus 101 has ever shared the screen and the audio previously among the detected devices, the control unit 202 of the communication apparatus 101 selects this device as the connection partner apparatus. Alternatively, the control unit 202 of the communication apparatus 101 may select a device located at a shortest distance from the communication apparatus 101 from among the detected devices as the connection partner apparatus, or may select a device capable of achieving the highest communication quality as the connection partner apparatus. The selection of the connection partner apparatus in step S303 may be made by the communication apparatus 102.

The Probe Request and Response are used in the device search in the present flowchart, but the device search may be conducted with use of a wireless signal such as a Beacon in compliance with the IEEE 802.11 series standards based on the Wi-Fi Miracast standard. Alternatively, the communication apparatus 101 or the communication apparatus 102 may conduct the device search with use of NFC, a quick response (QR) code (registered trademark), Bluetooth (registered trademark) Low Energy (BLE), or the like. For example, when the communication apparatus 101 has an NFC communication function, it is also possible to pair the communication apparatus 101 and the communication apparatus 102 according to an NFC touch operation and carry out communication after that based on the Wi-Fi Miracast standard.

Now, the communication apparatus 101 and the communication apparatus 102 may conduct a service search before performing the processes of step S304 and step S352. The service search is conducted based on the Wi-Fi Direct standard, and conducting the service search enables at least one of the communication apparatus 101 and the communication apparatus 102 to acquire information about a service that the other apparatus provides.

Next, in step S304, the control unit 202 of the communication apparatus 101 sets up a connection with the connection partner apparatus selected in step S303. Now, suppose that the communication apparatus 102 is selected as the connection partner apparatus in step S303. Therefore, in step S352, the control unit 202 of the communication apparatus 102 also sets up a connection with the communication apparatus 101. More specifically, the communication apparatus 101 and the communication apparatus 102 perform connection processing for Wi-Fi Miracast, and perform connection processing for Transmission Control Protocol (TCP) after that. The setup of the connection between the communication apparatus 101 and the communication apparatus 102 is completed by performing these pieces of connection processing.

The communication apparatus 101 and the communication apparatus 102 can select a method for the connection processing for Wi-Fi Miracast from the Wi-Fi Direct standard and the Tunneled Direct Link Setup (TDLS) standard, but perform this processing in compliance with the Wi-Fi Direct standard in the present exemplary embodiment.

Now, detailed procedures of step S304 and S352 will be described. First, the communication apparatus 102 transmits a Probe Request to the communication apparatus 101. Upon receiving the Probe Request, the communication apparatus 101 transmits a Probe Response to the communication apparatus 102. As a result, the communication apparatus 101 and the communication apparatus 102 confirm the presence of each other. Subsequently, to determine a communication apparatus serving as a Group Owner (GO), which plays a role of constructing a network in the wireless communication in compliance with the Wi-Fi Direct standard, the communication apparatus 101 transmits a GO Negotiation Request. The signal contains an Intent value, which indicates how much the communication apparatus 101 wants to become the GO. The communication apparatus that does not become the GO is assigned to a Client (CL), and plays a role of participating in the network constructed by the GO.

Upon receiving the GO Negotiation Request, the communication apparatus 102 transmits a GO Negotiation Response containing an Intent value of the communication apparatus 102 as a response thereto. Upon receiving the GO Negotiation Response, the communication apparatus 101 compares the Intent values of the communication apparatus 101 and the communication apparatus 102 to find out which is greater and which is smaller, and determines that a communication apparatus corresponding to a greater Intent value serves as the GO. On the other hand, a communication apparatus corresponding to a smaller Intent value is determined to serve as the CL.

The communication apparatus 101 transmits a GO Negotiation Confirm containing a result of the comparison of the Intent values to the communication apparatus 102. In the present exemplary embodiment, assume that the Intent value of the communication apparatus 101 is greater than the Intent value of the communication apparatus 102, and therefore the communication apparatus 101 and the communication apparatus 102 become the GO and the CL, respectively.

After that, parameter information required to establish a network connection between the communication apparatus 101 and the communication apparatus 102, such as information regarding the connection and security, is shared with use of the Wi-Fi Protected Setup (WPS) method. Then, the communication apparatus 102 serving as the CL transmits an Association Request to the communication apparatus 101 serving as the GO based on the exchanged parameter information. Upon receiving the signal, the communication apparatus 101 transmits an Association Response as a response thereto.

By this operation, the connection processing for Wi-Fi Miracast in compliance with the Wi-Fi Direct standard is completed between the communication apparatus 101 and the communication apparatus 102. The communication apparatus 101 and the communication apparatus 102 are assumed to serve as the GO and the CL, respectively, in the present exemplary embodiment, but their roles may be exchanged for each other. Furthermore, each wireless signal transmitted by the GO may be transmitted by the CL. In this case, the wireless signal transmitted by the CL is transmitted by the GO. Further, when performing the connection processing for Wi-Fi Miracast, the communication apparatus 101 and the communication apparatus 102 may use a Beacon, a Reassociation message, and the like besides the above-described wireless signals. Furthermore, the communication apparatus 101 and the communication apparatus 102 may use a Peer-to-Peer (P2P) Invitation message, a Provision Discovery message, and the like besides them.

Subsequently, the communication apparatus 101 and the communication apparatus 102 establish the TCP connection therebetween. The communication apparatus 101 and the communication apparatus 102 establish the connection by playing roles as a TCP server and a TCP client, respectively, and carrying out a three-way handshake.

The connection processing for Wi-Fi Miracast is completed and the TCP connection is established between the communication apparatus 101 and the communication apparatus 102 in this manner, by which the connection setup is completed.

In the case where the communication apparatus 101 and the communication apparatus 102 search for the device to carry out the mirroring with via the infrastructure network, the processes of step S302 to step S304, step S351, and step S352 are performed in the following manner.

The search for the device to carry out the mirroring with via the infrastructure network is conducted based on a multicast Domain Name System (DNS) (multicast DNS or mDNS). First, the communication apparatus 101 transmits a DNS packet in a multicast manner to other communication apparatuses participating in the infrastructure network via the AP 103 to which the communication apparatus 101 is connected. The communication apparatus 101 receives a response from a device supporting the mirroring via the AP 103, thereby detecting the device. More specifically, the communication apparatus 101 transmits a DNS packet containing a DNS record via the AP 103. The DNS record indicates that the communication apparatus 101 is conducting the search while specifying a communication apparatus supporting the wireless communication in compliance with the Wi-Fi Miracast standard. The DNS record contains any one of service names, i.e., Displaysrc, which indicates the source apparatus, and Display, which indicates the sink apparatus. Since the communication apparatus 101 searches for the sink apparatus as the device to carry out the mirroring with, Display, which indicates the sink apparatus, is contained as the DNS record. The communication apparatus 101 can transmit the DNS packet at an arbitrary transmission interval and an arbitrary number of times. Assume that the communication apparatus 101 repeatedly transmits the DNS packet until reaching a predetermined number of times when conducting the device search. Alternatively, the communication apparatus 101 may repeatedly transmit the DNS packet until a predetermined time period has elapsed. Further, the communication apparatus 101 may stop the transmission of the DNS packet based on reception of a response from a predetermined number of apparatuses on the other side.

Upon searching for the device to carry out the mirroring with via the infrastructure network, the control unit 202 of the communication apparatus 101 displays a search result, followed by a selection of the connection partner apparatus. The display of the search result and selection of the connection partner apparatus are carried out in a similar manner to step S303.

Subsequently, the control unit 202 of the communication apparatus 101 transmits an mDNS inquiry to the selected connection partner apparatus (the communication apparatus 102 in the present example) via the AP 103. The mDNS inquiry to be transmitted at this time is a signal inquiring about capability information about the communication apparatus 102, and a port number and a host name to be used in the communication between the communication apparatus 101 and the communication apparatus 102. The capability information about the communication apparatus 102 that is inquired by the present mDNS inquiry is information indicating, for example, whether the communication apparatus 102 is the sink apparatus, the source apparatus, or a dual-role apparatus. Upon receiving the mDNS inquiry, the communication apparatus 102 transmits an mDNS response containing the capability information about the apparatus itself, the port number, and the port name to the communication apparatus 101. Upon receiving the response, the communication apparatus 101 completes the setup of the connection with the communication apparatus 102.

Processing after the communication apparatus 101 and the communication apparatus 102 complete the setup of the connection is in common between both when the mirroring is carried out via the network in compliance with the Wi-Fi Direct standard and when the mirroring is carried out via the infrastructure network.

Subsequently, in step S305, the control unit 202 of the communication apparatus 101 carries out a Capability Negotiation. Similarly, in step S353, the control unit 202 of the communication apparatus 102 also carries out a Capability Negotiation. The Wi-Fi Miracast standard defines that Real Time Streaming Protocol (RTSP) should be used for the Capability Negotiation. RTSP is a protocol for controlling streaming. Generally, TCP is used as a transport protocol at a lower layer. In the Capability Negotiation, predetermined messages from RTSP M1 to M4 are exchanged between the communication apparatus 101 and the communication apparatus 102. The communication apparatus 101 acquires the capability information about the communication apparatus 102 from the exchanges of the RTSP messages, and determines a parameter to be used and notifies the communication apparatus 102 thereof. The communication apparatus 102 sets the parameter that the communication apparatus 102 is notified of from the communication apparatus 101. Specifically, the capability information refers to, for example, information such as a resolution and a frame rate of a screen that the communication apparatus 102 supports when it comes to the screen. Further, when it comes to the audio, the capability information refers to information such as a codec and a sampling frequency that the communication apparatus 102 supports. As a result of the Capability Negotiation, the type of the method for coding the screen and the audio, the resolution of the video image, the frame rate, and the like to be used when the mirroring is carried out are determined between the communication apparatus 101 and the communication apparatus 102. The capability information transmitted and received between the communication apparatus 101 and the communication apparatus 102 may be a part of these kinds of information.

After completion of the Capability Negotiation, in step S306 and step S354, the control unit 202 of the communication apparatus 101 and the control unit 202 of the communication apparatus 102 establish a session in compliance with the Wi-Fi Miracast standard. In the Wi-Fi Miracast standard, predetermined messages from RTSP M5 to M7 are exchanged between the communication apparatus 101 and the communication apparatus 102 to establish the session. Due to the exchanges of these RTSP messages, for example, the port number to be used between the communication apparatus 101 and the communication apparatus 102 is set, and the session is established.

After the establishment of the session, in step S307, the control unit 202 of the communication apparatus 101 starts mirroring processing implemented as the source apparatus, thereby starting transmitting the screen and audio stream. In the present step, the control unit 202 of the communication apparatus 101 performs processing for capturing the screen that the communication apparatus 101 is displaying and coding the captured image, processing for multiplexing the captured image, and processing for transmitting the data as the mirroring processing implemented as the source apparatus. The mirroring processing performed by the communication apparatus 101 may be a part of these processing procedures.

In step S355, the control unit 202 of the communication apparatus 102 starts mirroring processing implemented as the sink apparatus, thereby starting receiving the screen and audio stream. In the present step, the control unit 202 of the communication apparatus 102 performs processing for receiving and demultiplexing the data, processing for decoding the captured image, and processing for playing back the decoded captured image as the mirroring processing implemented as the sink apparatus. The mirroring processing performed by the communication apparatus 102 may be a part of these pieces of processing.

The communication apparatus 101 and the communication apparatus 102 perform the process of step S307 and the process of step S355, respectively, by which the stream of the information about the screen and the audio that the communication apparatus 101 is displaying and playing back is transmitted to the communication apparatus 102. The communication apparatus 102 displays the same screen and plays back the same audio as the communication apparatus 101 by playing back the transmitted stream of the information about the screen and the audio.

Subsequently, in step S308, the control unit 202 of the communication apparatus 101 determines whether an instruction to start the content redirection from the user is received. The instruction to start the content redirection from the user refers to the user's selecting a thumbnail image of the content. Alternatively, the instruction may be the user's selecting the URL of the content or may be the user's selecting a software key for issuing an instruction to play back the content. Alternatively, the instruction to start the content redirection may be starting up a predetermined application or reading in a predetermined web page, or may be scrolling a web page to a predetermined position. Alternatively, the communication apparatus 101 may determine that the instruction to start the content redirection is received, based on the fact that the user operates the communication apparatus 102 supporting a user input back channel (UIBC) defined in the Wi-Fi Miracast standard to, for example, select the thumbnail image of the content. UIBC refers to a function of transmitting a user operation input to the communication apparatus 102 serving as the sink apparatus to the communication apparatus 101 serving as the source apparatus. If determining that the instruction to start the content redirection is not received (NO in step S308), the control unit 202 of the communication apparatus 101 performs the process of step S307. On the other hand, if determining that the instruction to start the content redirection is received (YES in step S308), the control unit 202 of the communication apparatus 101 performs a process of step S309.

In step S309, the control unit 202 of the communication apparatus 101 inquires of the communication apparatus 102 whether the communication apparatus 102 supports the content redirection function. The control unit 202 of the communication apparatus 101 can use an RTSP GET_PARAMETER message for the inquiry about the content redirection function. In step S356, upon receiving the inquiry, the control unit 202 of the communication apparatus 102 notifies the communication apparatus 101 of whether the communication apparatus 102 supports the content redirection function as a response thereto. Alternatively, the control unit 202 of the communication apparatus 102 may notify the communication apparatus 101 of information such as a name of a content sharing service in which the communication apparatus 102 can play back the content with use of the content redirection function as the response thereto.

In step S310, the control unit 202 of the communication apparatus 101 determines whether the communication apparatus 102 supports the content redirection function, based on the response received in step S309. If determining that the communication apparatus 102 does not support the content redirection function (NO in step S310), the control unit 202 of the communication apparatus 101 performs the process of step S307. In this case, at least one of the communication apparatus 101 and the communication apparatus 102 may notify the user that the communication apparatus 102 does not support the content redirection function. On the other hand, if determining that the communication apparatus 102 supports the content redirection function (YES in step S310), in step S311, the control unit 202 of the communication apparatus 101 transmits the information related to the content to the communication apparatus 102. In the present flowchart, the content refers to the content with respect to which the playback instruction has been issued in step S308. The control unit 202 of the communication apparatus 101 transmits the information related to the content, thereby requesting the communication apparatus 102 to acquire and play back the content. Now, the information related to the content that is transmitted by the communication apparatus 101 is information such as the identifier for identifying the content placed in the cloud service 104, the service name, the information about the whereabouts of the content (the URI or the URL), and the playback start time (the offset). The information related to the content that is transmitted by the communication apparatus 101 may be a part of these kinds of information. Further, the control unit 202 of the communication apparatus 101 may use an RTSP SET_PARAMETER message when transmitting the information related to the content.

In step S357, the control unit 202 of the communication apparatus 102 receives the information related to the content from the communication apparatus 101. Then, in step S358, upon receiving the information related to the content, the control unit 202 of the communication apparatus 102 pauses the mirroring processing currently in progress. Similarly, in step S312, the control unit 202 of the communication apparatus 101 also pauses the mirroring processing currently in progress. The control unit 202 of the communication apparatus 101 and the control unit 202 of the communication apparatus 102 pause the mirroring processing by being prompted by the message exchange as the transmission and reception of the information related to the content that has been made in step S311 and step S357. Alternatively, the control unit 202 of the communication apparatus 101 may pause the mirroring processing of the apparatus itself and transmit a wireless signal instructing the communication apparatus 102 to pause the mirroring processing to the communication apparatus 102 after performing the process of step S311. Alternatively, the control unit 202 of the communication apparatus 102 may pause the mirroring processing of the apparatus itself and transmit a wireless signal instructing the communication apparatus 101 to pause the mirroring processing to the communication apparatus 101 after performing the process of step S357. In the case where the content redirection is carried out while the mirroring is in progress, pausing the mirroring processing can reduce processing loads derived from the mirroring processing on the communication apparatus 101 and the communication apparatus 102, thereby saving power consumption.

In step S359, upon pausing the mirroring processing, the control unit 202 of the communication apparatus 102 receives the content from the cloud server 104 based on the information related to the content that has been received in step S357, and plays back the content. In the present flowchart, the communication apparatus 102 receives the content from the cloud server 104 via the AP 103. There are various methods and protocols by which the control unit 202 of the communication apparatus 102 receives the content, depending on the type of the content and the type of the service. For example, the control unit 202 of the communication apparatus 102 may receive the content with use of the Hyper Text Transfer Protocol (HTTP) Live Streaming (HLS) method, the GET method of HTTP, or the like. Now, HLS is an abbreviation for HTTP Live Streaming, and HTTP is an abbreviation for Hyper Text Transfer Protocol.

In step S360, upon starting receiving and playing back the content based on the content redirection, the control unit 202 of the communication apparatus 102 detects a state of the content redirection and notifies the communication apparatus 101 of the state. In step S313, the control unit 202 of the communication apparatus 101 receives the notification about the state of the content redirection from the communication apparatus 102. Then, in step S360 and step S313, the control unit 202 of the communication apparatus 102 and the control unit 202 of the communication apparatus 101 each perform predetermined control based on the state of the content redirection. For example, when the control unit 202 of the communication apparatus 102 detects that the content is played back to its end and notifies the communication apparatus 101 thereof, the communication apparatus 101 and the communication apparatus 102 restart the paused mirroring. Alternatively, the communication apparatus 101 and the communication apparatus 102 may end the communication via the network in compliance with the Wi-Fi Direct standard or the communication via the infrastructure network. In a case where some predetermined content is supposed to be played back next to the content played back to its end, the communication apparatus 101 may transmit the information related to the content to be played back next to the communication apparatus 102. Upon receiving the information related to the content to be played back next, the communication apparatus 102 acquires the content based on the received related information, and plays back the content.

Subsequently, in step S314 and S361, each of the control unit 202 of the communication apparatus 101 and the control unit 202 of the communication apparatus 102 determines whether the mirroring operation is ended. The respective mirroring operations can be ended in step S313 and step S360. Further, the control unit 202 of the communication apparatus 101 and the control unit 202 of the communication apparatus 102 can end the mirroring operations in each of steps after step S307 and each of steps after step S355, respectively.

If determining that the mirroring is ended (YES in step S314), the control unit 202 of the communication apparatus 101 ends the processing of the flowchart illustrated in FIG. 3. Similarly, if also determining that the mirroring is ended (YES in step S361), the control unit 202 of the communication apparatus 102 ends the processing of the flowchart illustrated in FIG. 3. On the other hand, if determining that the mirroring is not ended (NO in step S314), the control unit 202 of the communication apparatus 101 performs the process of step S307, thereby restarting the paused mirroring processing. Further, if determining that the mirroring is not ended (NO in step S361), the control unit 202 of the communication apparatus 102 performs the process of step S355, thereby restarting the paused mirroring processing.

In this manner, the flowchart illustrated in FIG. 3 indicates the processing performed when the communication apparatus 101 and the communication apparatus 102 carry out the content redirection.

The communication apparatus 101 and the communication apparatus 102 are assumed to first start the mirroring and then carry out the content redirection when carrying out the content direction in FIG. 3, but are not limited thereto. The communication apparatus 101 and the communication apparatus 102 may start the content redirection without starting the mirroring after establishing the session in step S306 and step S354. More specifically, when the present flowchart is started, the communication apparatus 101 first makes the determination in step S308, and then performs the processes from step S302 to step S306 if determining YES in step S308. On the other hand, if determining NO in step S308, the communication apparatus 101 performs the process of step S308 again. In this case, the communication apparatus 102 performs the processes from step S351 to step S354 while the communication apparatus 101 performs the processes of step S302 to step S306. Further, after establishing the session in step S306, the communication apparatus 101 performs the process of step S309. Further, after establishing the session in step S354, the communication apparatus 102 performs the process of step S356. In this case, step S312 and step S358 are skipped. Further, whether the content redirection is ended is determined as the determination in each of step S314 and step S361.

Figure 4:
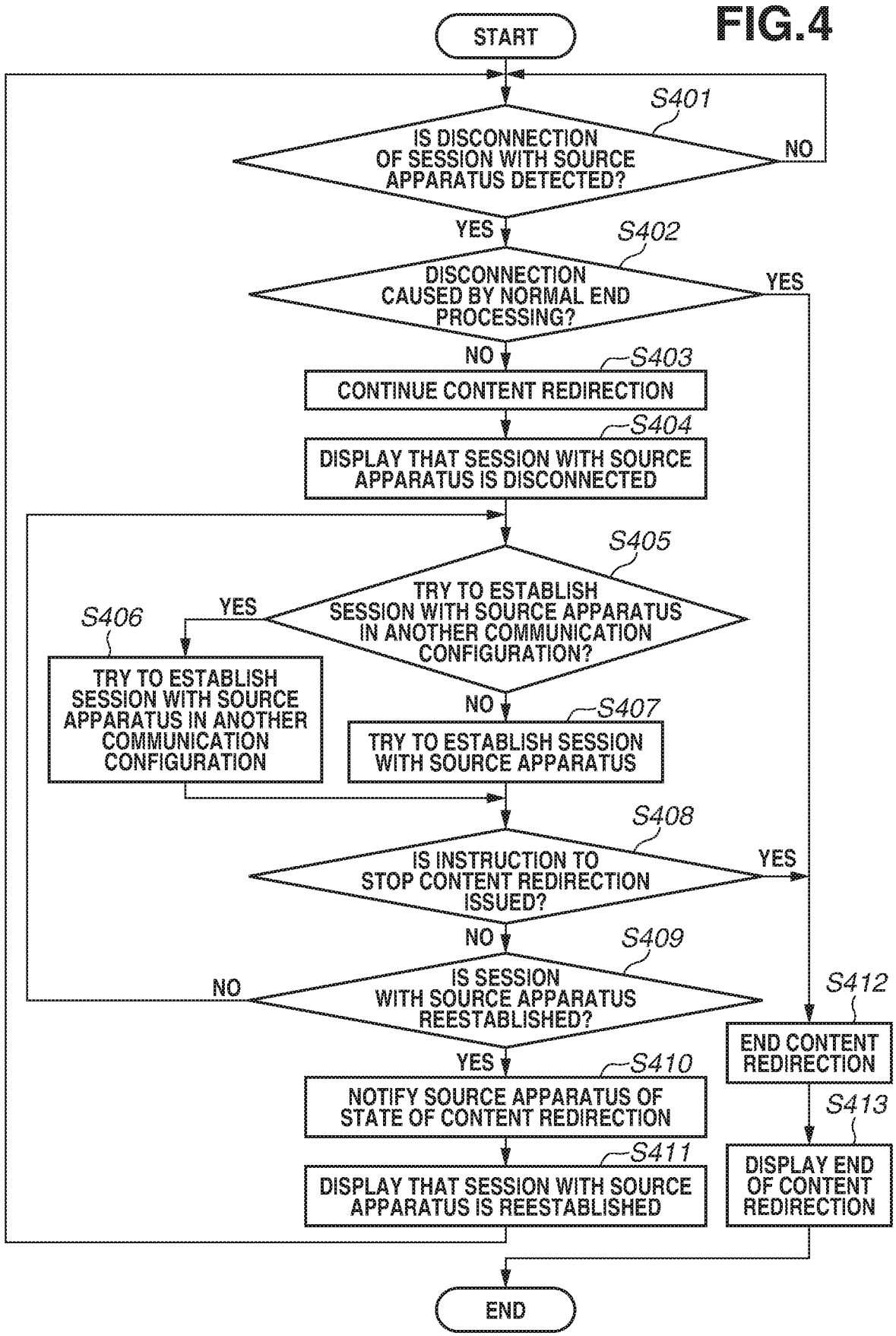
FIG. 4 is a flowchart illustrating processing performed when the communication apparatus carries out the content redirection and establishes a session with the communication apparatus according to one embodiment.

FIG. 4 is a flowchart illustrating processing realized by the control unit 202 reading out the computer program stored in the storage unit 201 of the communication apparatus 102 and executing the computer program when the communication apparatus 102 establishes the session with the communication apparatus 101.

At least a part of the flowchart illustrated in FIG. 4 may be realized by hardware. In the case where a part of the flowchart illustrated in FIG. 4 is realized by hardware, this can be achieved by, for example, automatically generating a dedicated circuit on an FPGA from a computer program for realizing each step by using a predetermined compiler. Alternatively, the present exemplary embodiment may be configured in such a manner that a part of the flowchart illustrated in FIG. 4 is realized by forming as hardware a gate array circuit in a similar manner to the FPGA. Alternatively, the present exemplary embodiment may be configured in such a manner that a part of the flowchart illustrated in FIG. 4 is realized by an ASIC.

The present flowchart is started according to the communication apparatus 102 starting playing back the content based on the content redirection. Alternatively, the present flowchart may be started according to the communication apparatus 102 starting receiving the content.

First, in step S401, the control unit 202 of the communication apparatus 102 determines whether the session with the communication apparatus 101 is disconnected. In the present step, the control unit 202 of the communication apparatus 102 determines whether the session to use when receiving the playback control signal for controlling the playback of the content based on the content redirection from the communication apparatus 101 serving as the source apparatus is disconnected. In the present exemplary embodiment, the communication apparatus 101 and the communication apparatus 102 are assumed to exchange the playback control signal with use of the session established in step S306 and step S354 illustrated in FIG. 3. The exchange of the playback control signal is not limited thereto, and the communication apparatus 101 and the communication apparatus 102 may exchange the playback control signal via a session different from the session established in step S306 and step S354 illustrated in FIG. 3. If determining that the session with the communication apparatus 101 is not disconnected (NO in step S401), the control unit 202 of the communication apparatus 102 makes the determination in step S401 again. On the other hand, if determining that the session with the communication apparatus 101 is disconnected (YES in step S401), the control unit 202 of the communication apparatus 102 performs a process of step S402.

In step S402, the control unit 202 of the communication apparatus 102 determines whether the disconnection of the session with the communication apparatus 101 is caused by normal end processing. More specifically, the control unit 202 of the communication apparatus 102 makes the determination based on, for example, whether a message indicating an end of the content redirection is received from the communication apparatus 101 by the communication apparatus 102. The control unit 202 of the communication apparatus 102 determines that the disconnection of the session is caused by the normal end processing, based on the reception of the message indicating the end of the content redirection from the communication apparatus 101. On the other hand, the control unit 202 of the communication apparatus 102 determines that the disconnection of the session is not caused by the normal end processing, based on the reception of no message indicating the end of the content redirection. If the session is disconnected after the normal end processing is performed (YES in step S402), the control unit 202 of the communication apparatus 102 performs a process of step S412. On the other hand, if the session is disconnected without the normal end processing performed (NO in step S402), the control unit 202 of the communication apparatus 102 performs a process of step S403.

Further, the communication apparatus 102 may receive the message indicating the end of the content redirection from an apparatus other than the communication apparatus 101. More specifically, for example, the communication apparatus 102 may receive the message indicating the end of the content redirection from a remote controller that is an accessory device thereof. In this manner, the communication apparatus 102 may receive the message indicating the end of the content redirection from the accessory device other than the communication apparatus 101.

Suppose that the processing for normally ending the content redirection is accompanied by exchanges of a plurality of messages between the communication apparatus 101 and the communication apparatus 102. In this case, the control unit 202 of the communication apparatus 102 determines that the disconnection of the session is caused by the normal end processing, based on the disconnection of the session after all the messages are exchanged. On the other hand, the control unit 202 of the communication apparatus 102 determines that the disconnection of the session is not caused by the normal end processing, based on the disconnection of the session before all the messages are exchanged. Alternatively, the control unit 202 of the communication apparatus 102 may determine that the disconnection of the session is caused by the normal end processing, based on the disconnection of the session after a message supposed to be transmitted or received at the end of the end processing is transmitted or received. On the other hand, the control unit 202 of the communication apparatus 102 may determine that the disconnection of the session is not caused by the normal end processing, based on the disconnection of the session before the message supposed to be transmitted or received at the end of the end processing is transmitted or received.

Alternatively, the control unit 202 of the communication apparatus 102 may make the determination based on whether an instruction to stop the content redirection is issued from the user to the communication apparatus 102 in step S402. If the instruction to stop the content redirection is issued from the user, the control unit 202 of the communication apparatus 102 determines YES in step S402. On the other hand, if the instruction to stop the content redirection is not issued from the user, the control unit 202 of the communication apparatus 102 determines NO in step S402. The communication apparatus 102 receives the instruction to stop the content redirection from the user via the input unit 204. More specifically, in a case where the input unit 204 of the communication apparatus 102 is equipped with a touch panel or a control button, the user issues the instruction to stop the content redirection to the communication apparatus 102 by operating them.

Alternatively, the control unit 202 of the communication apparatus 102 may be configured to make the determination based on whether the session is disconnected with use of a keepalive request defined in the Wi-Fi Miracast standard between the communication apparatus 101 and the communication apparatus 102. In the Wi-Fi Miracast standard, the communication apparatus 101 and the communication apparatus 102 can confirm whether the session between the communication apparatus 101 and the communication apparatus 102 is valid and manage the session by transmitting or receiving the keepalive request within a predetermined period. More specifically, first, the communication apparatus 101 sets a keepalive interval in the session with the communication apparatus 102. In the Wi-Fi Miracast standard, the communication apparatus 101 sets the keepalive interval with use of a timeout value in an RTSP M6 (SETUP) response. Next, the communication apparatus 101 transmits the keepalive request to the communication apparatus 102. In the Wi-Fi Miracast standard, the keepalive request refers to an RTSP M16 (GET_PARAMETER) request. The communication apparatus 101 transmits the keepalive request to the communication apparatus 102 at a shorter interval than the set keepalive interval. Upon receiving the keepalive request from the communication apparatus 101, the communication apparatus 102 transmits a keepalive response to the communication apparatus 101. In the Wi-Fi Miracast standard, the keepalive response refers to an RTSP M16 (GET_PARAMETER) response. If not receiving the keepalive request from the communication apparatus 101 even only once during the set keepalive interval, the communication apparatus 102 disconnects the session with the communication apparatus 101. If not receiving the keepalive response from the communication apparatus 102 even only once during the set keepalive interval, the communication apparatus 101 disconnects the session with the communication apparatus 102. On the other hand, if receiving the keepalive response from the communication apparatus 102 at least once during the set keepalive interval, the communication apparatus 101 determines that the communication apparatus 102 is still valid and does not disconnect the session. The communication apparatus 101 determines that the communication apparatus 102 is still alive and does not disconnect the session regardless of what kind of RTSP M 16 response is received from the communication apparatus 102. In the keepalive, the roles of the communication apparatus 101 and the communication apparatus 102 may be exchanged for each other. If not receiving the keepalive request from the communication apparatus 101 during the keepalive interval and then disconnecting the session, the control unit 202 of the communication apparatus 102 determines NO in step S402.

The apparatus that transmits the keepalive request disconnects the session with the partner apparatus if not receiving the keepalive response since the apparatus itself transmits the keepalive request until the keepalive interval has elapsed. Alternatively, the apparatus that transmits the keepalive request may disconnect the session if not receiving the keepalive response newly since the apparatus receives the keepalive response from the partner apparatus until the keepalive interval has elapsed. Furthermore, the apparatus that receives the keepalive request disconnects the session with the partner apparatus if not receiving the keepalive request newly since the apparatus itself transmits the keepalive response until the keepalive interval has elapsed. Alternatively, the apparatus that receives the keepalive request may disconnect the session with the partner apparatus if not receiving the keepalive request newly since the apparatus receives the keepalive request until the keepalive interval has elapsed. Alternatively, the apparatus that transmits the keepalive request and the apparatus that receives the keepalive request may maintain the session based on receiving some signal from the partner apparatus instead of receiving the keepalive response and the keepalive request, respectively.

Further, the method for confirming whether to disconnect the session is not limited thereto, and a similar determination may be made with use of another protocol providing a PING message of RTSP, a KEEP-ALIVE message of an HTTP layer, or the like. The communication apparatus 101 and the communication apparatus 102 can make the determination by transmitting and receiving a confirmation request signal for confirming whether the session is valid and a confirmation response signal as a response thereto to thereby confirm whether the session is valid, and determining whether to disconnect the session. Alternatively, the control unit 202 of the communication apparatus 102 may be configured to determine NO in step S402 if detecting some communication error in the session between the communication apparatus 101 and the communication apparatus 102.

In step S403, the control unit 202 of the communication apparatus 102 continues the content redirection. More specifically, even when the session with the communication apparatus 101 is disconnected, the control unit 202 of the communication apparatus 102 continues acquiring the content from the cloud server 104 and playing back the acquired content if the disconnection is not caused by the normal end processing.

Subsequently, in step S404, the control unit 202 of the communication apparatus 102 displays that the session with the communication apparatus 101 serving as the source apparatus is disconnected, on the output unit 205 of the communication apparatus 102. One example of a display screen of the communication apparatus 102 in the present step will be described with reference to FIG. 5, which will be described.

FIG. 5 illustrates one example of the display screen that the communication apparatus 102 displays when detecting the disconnection of the session with the communication apparatus 101 serving as the source apparatus. In FIG. 5, the communication apparatus 102 continues the content redirection, and is playing back the content acquired from the cloud server 104 and displaying the screen based on the played-back content. If detecting the disconnection of the session with the communication apparatus 101 serving as the source apparatus and determining that the disconnection is not caused by the normal end processing, the communication apparatus 102 displays a disconnection notification 501 notifying the user that the session is disconnected while displaying the content. More specifically, the control unit 202 of the communication apparatus 102 presents the display after performing image processing in such a manner that the content and the disconnection notification 501 are displayed while being superimposed on each other.

The method for displaying the disconnection notification 501 is not limited thereto. The control unit 202 of the communication apparatus 102 may control the display in such a manner that the disconnection notification 501 is displayed in a region different from a region where the content is displayed, on the output unit 205 of the communication apparatus 102. Alternatively, the control unit 202 of the communication apparatus 102 may perform control so as to constantly display the state of the session with the communication apparatus 101 by using an icon or the like. Alternatively, the control unit 202 of the communication apparatus 102 may perform control so as to, when the session with the communication apparatus 101 is established, display an icon making it understandable, and, when the session with the communication apparatus 101 is disconnected, display an icon making it understandable. Further, the control unit 202 of the communication apparatus 102 may perform control so as to display a reason why the session is disconnected along with performing the display of the disconnection of the session when the session with the communication apparatus 101 is disconnected. For example, the control unit 202 of the communication apparatus 102 may present a display reading "the wireless communication with the source apparatus is disconnected" as the disconnection notification 501. The control unit 202 of the communication apparatus 102 may display a device name of the communication apparatus 101 instead of the display "source apparatus". Furthermore, the control unit 202 of the communication apparatus 102 may present a display reading "the playback of the content cannot be controlled from the source apparatus". Alternatively, the control unit 202 of the communication apparatus 102 may perform control so as to display an error code as the disconnection notification 501. Alternatively, the communication apparatus 102 may display that the playback of the content cannot be controlled by the communication apparatus 101 along with or instead of the disconnection notification 501.

The display of the disconnection notification 501 disappears based on reestablishment of the session between the communication apparatus 101 and the communication apparatus 102. Alternatively, the display of the disconnection notification 501 may disappear after a predetermined time period has elapsed. Alternatively, the display of the disconnection notification 501 may disappear based on the fact that the user performs a predetermined user operation on the communication apparatus 102. Now, regarding the predetermined user operation, for example, the display of the disconnection notification 501 disappears based on the fact that the user presses a predetermined button on the remote controller in the case where the communication apparatus 102 is a communication apparatus that can be controlled by the remote controller. Alternatively, the display of the disconnection notification 501 may disappear based on a user's touch operation in the case where the communication apparatus 102 is a communication apparatus equipped with the touch panel. Alternatively, the display of the disconnection notification 501 may disappear based on the fact that the user presses a predetermined software key.

In this manner, as illustrated in FIG. 5, when the session with the communication apparatus 101 is disconnected and the disconnection is not caused by the normal end processing, the present configuration can notify the user that the session with the communication apparatus 101 is disconnected by causing the communication apparatus 102 to display the disconnection notification 501. The user is considered to pay attention to the communication apparatus 102 where the content is being displayed when playing back the content with use of the content redirection. Therefore, when the session between the communication apparatus 101 and the communication apparatus 102 is disconnected, the present configuration can make the user easily aware that the session with the communication apparatus 101 is disconnected by causing the communication apparatus 102 to display the disconnection notification 501. Further, for example, suppose that the communication apparatus 101 is a communication apparatus set so as to transition to a sleep mode and turn off the display of the screen if a user operation or the like is not input for a predetermined time period, like a smart-phone. In this case, the present configuration is convenient, because eliminating the necessity for the user to return the communication apparatus 101 from the sleep mode to confirm the state of the session with the communication apparatus 101 by causing the communication apparatus 102 to display the disconnection notification 501. Furthermore, the present configuration also improves a power saving performance of the communication apparatus 101.

In step S405, the control unit 202 of the communication apparatus 102 determines whether to try processing for establishing a session with the communication apparatus 101 in another communication configuration. For example, in the case where the session is established between the communication apparatus 101 and the communication apparatus 102 via the wireless communication in compliance with the Wi-Fi Direct standard, the other communication configuration means the infrastructure network. Alternatively, the other communication configuration may be, for example, other wireless communication in compliance with Bluetooth or the IEEE 802.11 series standards. The present determination is made based on the state of the communication between the communication apparatus 101 and the communication apparatus 102. More specifically, suppose that the communication apparatus 101 and the communication apparatus 102 perform the processing of the flowchart illustrated in FIG. 3 and establish the session via, for example, the wireless communication in compliance with the Wi-Fi Direct standard. However, if an error has occurred in the communication between the communication apparatus 101 and the communication apparatus 102 with them kept connected via the wireless communication in compliance with the Wi-Fi Direct standard, the control unit 202 of the communication apparatus 102 determines not to perform the processing for establishing the session with the communication apparatus 101 in the other communication configuration. On the other hand, if the control unit 202 of the communication apparatus 102 detects the disconnection of the wireless communication with the communication apparatus 101, the control unit 202 of the communication apparatus 102 determines to perform the processing for establishing the session with the communication apparatus 101 in the other communication configuration.

The situation in which the communication apparatus 102 maintains the wireless communication with the communication apparatus 101 but the session therewith is disconnected occurs when an application program used to carry out the content redirection is crashed on the communication apparatus 102. Alternatively, the situation may occur when an application program used to carry out the content redirection is crashed on the communication apparatus 101. Alternatively, the situation may occur when an error has occurred in protocol processing of a communication protocol that the communication apparatus 101 and the communication apparatus 102 use to carry out the content redirection. Alternatively, the situation may occur when a message cannot be transmitted and received as an error has occurred in a communication protocol at a lower layer than the communication protocol that the communication apparatus 101 and the communication apparatus 102 use to carry out the content redirection. The communication protocol at the lower layer than the communication protocol used to carry out the content redirection means a communication protocol at a higher layer than the communication protocol used in the wireless communication.

Suppose that the communication apparatus 102 establishes the session with the communication apparatus 101 via, for example, the wireless communication in compliance with the Wi-Fi Direct standard, but the session with the communication apparatus 101 is disconnected with the wireless communication maintained and an error has occurred. In this case, in step S405, the control unit 202 of the communication apparatus 102 determines not to try the processing for establishing the session in the other communication configuration. However, the control unit 202 of the communication apparatus 102 may determine to try the processing for establishing the session in the other communication configuration when the communication apparatus 102 makes the determination in step S405 again after failing to reestablish the session although performing a process of step S407, which will be described below.

If determining to try the processing for establishing the session with the communication apparatus 101 in the other communication configuration (YES in step S405), the control unit 202 of the communication apparatus 102 performs a process of step S406. On the other hand, if determining not to try the processing for establishing the session with the communication apparatus 101 in the other communication configuration (NO in step S405), the control unit 202 of the communication apparatus 102 performs the process of step S407.

In step S406, the control unit 202 of the communication apparatus 102 tries the processing for establishing the session with the communication apparatus 101 in the other communication configuration. For example, if detecting that the session established with the communication apparatus 101 via the wireless communication in compliance with the Wi-Fi Direct standard is disconnected, the communication apparatus 102 tries to establish the session via the infrastructure network. In the present exemplary embodiment, the communication apparatus 102 is connected to the AP 103, and therefore participates in the infrastructure network constructed by the AP 103. Similarly, in the present exemplary embodiment, the communication apparatus 101 is also connected to the AP 103, and participates in the infrastructure network constructed by the AP 103. Therefore, the control unit 202 of the communication apparatus 102 tires to establish the session with the communication apparatus 101 via the AP 103.

Alternatively, in a case where the communication apparatus 101 is not connected to the AP 103, the control unit 202 of the communication apparatus 102 may perform control so as to display, on the output unit 205 of the communication apparatus 102, a message intended to prompt the user to connect the communication apparatus 101 to the AP 103 to which the communication apparatus 102 is connected. For example, the control unit 202 of the communication apparatus 102 displays identification information about the AP 103 together with the message prompting the user to connect the communication apparatus 101 to the AP 103. Examples of the identifier of the AP 103 include a service set identifier (SSID). The control unit 202 of the communication apparatus 102 presents a display reading "please connect the source apparatus to the access point identified by SSID=XXXX" on the output unit 205 of the communication apparatus 102. The identifier of the AP 103 is not limited to the SSID, and may be any information as long as it enables the user to uniquely identify the AP 103. The display enables the communication apparatus 101 and the communication apparatus 102 to communicate with each other via the AP 103 to thus establish the session therebetween by causing the user to connect the communication apparatus 101 to the AP 103, even when the communication apparatus 101 is not connected to the AP 103.

Having described the example in which the communication apparatus 102 establishes the session with the communication apparatus 101 via the infrastructure network, the establishment of the session in the other communication configuration is not limited thereto. The communication apparatus 102 may be configured to try to establish the session with use of another communication method in compliance with the IEEE 802.11 series standards. For example, the communication apparatus 102 may try to establish the session with use of another communication method of ad-hoc communication, wireless communication in compliance with the Wi-Fi Aware standard, ASP, or the like.

Regarding the operation when the communication apparatus 102 tries to establish the session with the communication apparatus 101 in the other communication configuration, another example thereof will be described now. The communication apparatus 102 may try to establish the session with the communication apparatus 101 with use of other communication based on Bluetooth or the like, instead of the communication in compliance with the IEEE 802.11 series standards, as the communication configuration. The following description will focus on an example in which the communication apparatus 102 establishes the session using Bluetooth.

Suppose that the communication apparatus 101 and the communication apparatus 102 are each equipped with a communication function capable of carrying out the wireless communication using Bluetooth.

The communication apparatus 102 exchanges communication capability information between the communication apparatus 101 and the communication apparatus 102 in advance before the session with the communication apparatus 101 is disconnected. The communication capability information contains information about a communication method that each of the communication apparatus 101 and the communication apparatus 102 supports. The communication apparatus 101 recognizes that the communication using Bluetooth can be carried out between the communication apparatus 101 and the communication apparatus 102 by exchanging the communication capability information with the communication apparatus 102. Similarly, the communication apparatus 102 also recognizes that the communication using Bluetooth can be carried out between the communication apparatus 101 and the communication apparatus 102 by exchanging the communication capability information with the communication apparatus 101.

Suppose that the communication apparatus 102 detects that the session with the communication apparatus 101 is disconnected, and the wireless communication between the communication apparatus 101 and the communication apparatus 102 is disconnected. In this case, the communication apparatus 102 starts up Bluetooth, and tries to connect to the communication apparatus 101 with use of Bluetooth. If connecting to the communication apparatus 101 with use of Bluetooth, the communication apparatus 102 tries to establish a session with the communication apparatus 101 via the communication using Bluetooth.

In this case, the control unit 202 of the communication apparatus 102 may display that the session will be established with use of Bluetooth, on the output unit 205 of the communication apparatus 102. More specifically, when detecting the disconnection of the wireless LAN with the communication apparatus 101, the communication apparatus 102 may display that the session will be established with use of Bluetooth, in addition to the disconnection notification 501, on the output unit 205 of the communication apparatus 102. Alternatively, the control unit 202 of the communication apparatus 102 may present a display intended to prompt the user to connect the communication apparatus 101 and the communication apparatus 102 to each other with use of Bluetooth. For example, the communication apparatus 102 may present a display reading "please start up Bluetooth of the source apparatus and attempt the connection" on the output unit 205. Alternatively, the control unit 202 of the communication apparatus 102 may present a display intended to prompt the user to perform a specific operation for connecting the communication apparatus 101 and the communication apparatus 102 to each other with use of Bluetooth. Alternatively, the control unit 202 of the communication apparatus 102 may perform control so as to display, for example, PIN code information used in pairing in Bluetooth together therewith.

Suppose that the communication apparatus 102 is a communication apparatus capable of carrying out the communication in compliance with the IEEE 802.11 series standards and the communication using Bluetooth in parallel with each other, and the wireless communication with the communication apparatus 101 is disconnected. In this case, the communication apparatus 102 may wait for the communication apparatus 101 via the wireless communication in compliance with the IEEE 802.11 series standards and establish the session using Bluetooth in parallel.

The above description has focused on the method in which the communication apparatus 102 uses Bluetooth as another communication configuration different from the wireless communication in compliance with the IEEE 802.11 series standards, but the other communication configuration is not limited thereto and the communication apparatus 102 may use a communication method other than Bluetooth.

Alternatively, the communication apparatus 102 may try to establish the session in another frequency band as the try of the establishment of the session in the other communication configuration. For example, in a case where the communication apparatus 102 has used a 2.4 GHz band as the frequency band before the session is disconnected, the communication apparatus 102 may try to establish the session with use of another frequency band.

When making the determination in step S405, the communication apparatus 102 may make the determination based on the fact that the disconnection and the reconnection of the wireless communication between the communication apparatus 101 and the communication apparatus 102 have occurred a predetermined or greater number of times within a predetermined time period. More specifically, the control unit 202 of the communication apparatus 102 determines YES in step S405 if the disconnection and the reconnection of the wireless communication between the communication apparatus 101 and the communication apparatus 102 have occurred the predetermined or greater number of times within the predetermined time period. On the other hand, the control unit 202 of the communication apparatus 102 determines NO in step S405 if the disconnection and the reconnection of the wireless communication between the communication apparatus 101 and the communication apparatus 102 have not occurred the predetermined or greater number of times within the predetermined time period. For example, in a case where the communication apparatus 101 and the communication apparatus 102 carry out the wireless communication with use of the frequency band of the 2.4 GHz band under an indoor environment, the wireless communication between the communication apparatus 101 and the communication apparatus 102 may be frequently disconnected by being affected by a microwave or the like. In such a case, the wireless communication is disconnected and reconnected between the communication apparatus 101 and the communication apparatus 102 the predetermined or greater number of times within the predetermined time period, so that the communication apparatus 102 may be configured to try to establish the session via wireless communication in another frequency band such as a 5 GHz band.

The communication apparatus 102 may be configured to make the determination in step S405 based on a user's selection. More specifically, the control unit 202 of the communication apparatus 102 displays an inquiry screen inquiring of the user whether to reestablish the session in the other communication configuration on the output unit 205. The user selects whether to reestablish the session in the other communication configuration by inputting a user operation via the input unit 204 of the communication apparatus 102. If the user selects reestablishing the session in the other communication configuration, the control unit 202 of the communication apparatus 102 determines YES in step S405. On the other hand, if the user selects not reestablishing the session in the other communication configuration, the control unit 202 of the communication apparatus 102 determines NO in step S405. The control unit 202 of the communication apparatus 102 may be configured to display all or a part of communication configurations possible to be employed as the other communication configuration on the inquiry screen, thereby enabling the user to select the communication configuration to reestablish the session.

If determining not to try to establish the session with the communication apparatus 101 in the other communication configuration (NO in step S405), in step S407, the control unit 202 of the communication apparatus 102 tries to reestablish the session with the communication apparatus 101 in the current communication configuration.

In step S408, the control unit 202 of the communication apparatus 102 determines whether an instruction to stop the content redirection is issued. More specifically, the instruction to stop the content redirection is issued from the user to the communication apparatus 102 via, for example, the remote controller attached to the communication apparatus 102. The instruction to stop the content redirection is not limited to being issued via the remote controller of the communication apparatus 102. In the case where the communication apparatus 102 is equipped with the control button, the touch panel, or the like, the instruction may be issued by the user's operating them. Alternatively, in a case where the communication apparatus 101 and the communication apparatus 102 can communicate with each other via another communication method such as infrared communication, the control unit 202 of the communication apparatus 102 may determine that the instruction to stop the content redirection is issued if receiving the message indicating the end of the content redirection from the communication apparatus 101 with use of the communication method. If determining that the instruction to stop the content redirection is not issued (NO in step S408), the control unit 202 of the communication apparatus 102 performs a process of step S409. On the other hand, if determining that the instruction to stop the content redirection is issued (YES in step S408), the control unit 202 of the communication apparatus 102 performs the process of step S412.

The control unit 202 of the communication apparatus 102 may perform the process of step S408 in parallel with the processes from step S405 to step S407. More specifically, the control unit 202 of the communication apparatus 102 may perform the process of step S412 if the instruction to stop the content redirection is issued while the control unit 202 of the communication apparatus 102 is performing the processes from step S405 to step S407. In this case, the control unit 202 of the communication apparatus 102 may stop the processing for establishing the wireless communication or the processing for establishing the session with the communication apparatus 101 that is performed in step S406 or step S407. For example, if the communication apparatus 101 and the communication apparatus 102 establish the session via the wireless communication in compliance with the Wi-Fi Direct standard and the session is disconnected, the communication apparatus 102 performs the processing for reestablishing the session via the wireless communication. However, if receiving the instruction to end the content redirection while performing the processing for reestablishing the session, the communication apparatus 102 may stop the reestablishment processing. The operation in this case is not limited thereto, and the communication apparatus 102 may stop a part or all of processes or functions required to reestablish the session with the communication apparatus 101.

In step S409, the control unit 202 of the communication apparatus 102 determines whether the session with the communication apparatus 101 is reestablished. If determining that the session with the communication apparatus 101 cannot be reestablished (NO in step S409), the control unit 202 of the communication apparatus 102 performs the process of step S405. On the other hand, if determining that the session with the communication apparatus 101 can be reestablished (YES in step S409), the control unit 202 of the communication apparatus 102 performs a process of step S410. The control unit 202 of the communication apparatus 102 may operate so as to end the try as an error and stop the content redirection if a predetermined time period has elapsed with the communication apparatus 102 keeping failing to reestablish the session with the communication apparatus 101. Alternatively, the control unit 202 of the communication apparatus 102 may also operate so as to end the try as an error and stop the content redirection similarly if trying to reestablish the session with the communication apparatus 101 a predetermined or greater number of times.

In step S410, upon reestablishing the session with the communication apparatus 101, the control unit 202 of the communication apparatus 102 notifies the communication apparatus 101 of the state of the content redirection on the communication apparatus 102. The state of the content redirection refers to a state like whether the communication apparatus 102 is carrying out the content redirection or the content redirection is stopped on the communication apparatus 102. If the content redirection is stopped due to occurrence of some error before the session with the communication apparatus 101 is reestablished, the control unit 202 of the communication apparatus 102 notifies the communication apparatus 101 of that. In this case, the control unit 202 of the communication apparatus 102 may notify the communication apparatus 101 of not only the state of the content redirection but also a content and a cause of the error that has occurred. The control unit 202 of the communication apparatus 102 notifies the communication apparatus 101 of the state of the content redirection by transmitting information indicating such a state of the content redirection to the communication apparatus 101. More specifically, the control unit 202 of the communication apparatus 102 notifies the communication apparatus 101 of the state of the content redirection with use of an RTSP message. The method for the notification is not limited thereto, and the communication apparatus 102 may employ any method as long as being able to notify the communication apparatus 101 of the state of the content redirection. The communication apparatus 101 may transmit a restart instruction message instructing the communication apparatus 102 to restart the content redirection to the communication apparatus 102 according to receiving the notification indicating that the content redirection is stopped on the communication apparatus 102. Further, the control unit 202 of the communication apparatus 102 may restart the content redirection according to receiving the restart instruction message from the communication apparatus 101 when the content redirection is stopped thereon.

In step S411, the control unit 202 of the communication apparatus 102 notifies the user that the session with the communication apparatus 101 is reestablished, by displaying it on the output unit 205 of the communication apparatus 102. Due to this display, the user can be aware that he/she has become able to control the playback based on the content redirection with use of the communication apparatus 101 serving as the source apparatus by confirming the display on the communication apparatus 102 serving as the sink apparatus. After performing the process of step S411, the control unit 202 of the communication apparatus 102 performs the process of step S401.

On the other hand, if determining that the instruction to stop the content redirection is issued from an apparatus other than the communication apparatus 101 in step S408 (YES in step S408), the control unit 202 of the communication apparatus 102 performs the process of step S412. In step S412, the control unit 202 of the communication apparatus 102 performs processing for ending the content redirection. More specifically, the control unit 202 of the communication apparatus 102 ends the content redirection and stops the display of the content on the output unit 205 of the communication apparatus 102. If performing the present step after determining YES in step S402, the communication apparatus 102 may already stop the display of the content on the output unit 205 before the session with the communication apparatus 101 is disconnected.

In step S413, the control unit 202 of the communication apparatus 102 displays that the content redirection is ended, on the output unit 205 of the communication apparatus 102. Due to this display, the user can be aware that the content redirection is ended. After performing the process of step S413, the control unit 202 of the communication apparatus 102 ends the flow according to the present flowchart.

If determining that the session with the communication apparatus 101 is reestablished in step S409, the control unit 202 of the communication apparatus 102 can receive the playback control information for controlling the playback of the content from the communication apparatus 101.

Further, the control unit 202 of the communication apparatus 102 notifies the user that the session with the communication apparatus 101 is disconnected in step S404, but the present processing is not limited thereto. More specifically, the control unit 202 of the communication apparatus 102 may determine whether the communication apparatus 102 has a playback control function for controlling the playback of the content that is being played back on the communication apparatus 102 if determining NO in step S402. In a case where the communication apparatus 102 can control the playback of the content with use of a device such as the remote controller, the control unit 202 of the communication apparatus 102 determines that the communication apparatus 102 has the playback control function. Alternatively, in a case where the communication apparatus 102 can control the playback of the content based on a user operation received via the input unit 204, the control unit 202 of the communication apparatus 102 also determines that the communication apparatus 102 has the playback control function. More specifically, in a case where the communication apparatus 102 is equipped with, for example, the touch panel as the input unit 204 and can control the playback of the content based on a user operation received via the touch panel, the control unit 202 of the communication apparatus 102 determines that the communication apparatus 102 has the playback control function.

If determining that the communication apparatus 102 does not have the playback control function, the control unit 202 of the communication apparatus 102 performs the processes of step S403 and steps subsequent thereto. On the other hand, if determining that the communication apparatus 102 has the playback control function, the control unit 202 of the communication apparatus 102 does not notify the user that the session with the communication apparatus 101 is disconnected. More specifically, if determining that the communication apparatus 102 has the playback control function, the control unit 202 of the communication apparatus 102 performs the process of step S403, skips the process of step S404, and performs the process of step S405. When the session between the communication apparatus 101 and the communication apparatus 102 is disconnected and the communication apparatus 102 does not have the playback control function, the present configuration can make the user aware that the playback of the content cannot be controlled by causing the communication apparatus 102 to notify the user. On the other hand, even when the session with the communication apparatus 101 is disconnected, the communication apparatus 102 does not have to notify the user because the user can control the playback of the content if the communication apparatus 102 has the playback control function.

The control of the playback of the content that is exerted by the playback control function that the communication apparatus 102 has refers to the control of the playback of the content that is performed with the communication apparatus 102 powered on based on a user operation received by the communication apparatus 102. For example, in the case where the communication apparatus 102 is a television, upon receiving a user operation to instruct the communication apparatus 102 to stop the content from the user via the remote controller, the communication apparatus 102 stops the playback of the content and displays a standby screen or a television program. The control of the playback of the content that is exerted by the playback control function that the communication apparatus 102 has does not include a stop of the playback of the content due to a power-off of the communication apparatus 102.

Alternatively, the control unit 202 of the communication apparatus 102 may switch the content of the notification to the user based on whether the communication apparatus 102 has the function of controlling the playback of the content. More specifically, upon detecting that the session with the communication apparatus 101 is disconnected, the control unit 202 of the communication apparatus 102 determines whether the communication apparatus 102 has the playback control function.

In this manner, in FIG. 4, the communication apparatus 102 notifies the user by displaying that the communication with the communication apparatus 101 is disconnected if the communication with the communication apparatus 101 is disconnected when the content redirection is being carried out. It is considered that, when the content redirection is being carried out, the user pays attention to the communication apparatus 102 because the content is played back and displayed by the communication apparatus 102 serving as the sink apparatus. Therefore, when the communication with the communication apparatus 101 is disconnected, the present configuration can make the user easily aware that the communication is disconnected by causing the communication apparatus 102 to display that the communication with the communication apparatus 101 is disconnected.

Further, suppose that the communication apparatus 101 is such an apparatus that the screen thereof can be powered off while the wireless communication with the communication apparatus 102 is maintained, such as a smart-phone. In such a case, the present configuration eliminates the necessity for the user to power on the screen of the communication apparatus 101 to confirm whether the communication between the communication apparatus 101 and the communication apparatus 102 is maintained by causing the communication apparatus 102 to display that the communication with the communication apparatus 101 is disconnected to notify the user of it. Therefore, the communication apparatus 101 can operate with saved power consumption.

FIG. 6 is a flowchart illustrating processing realized by the control unit 202 reading out the computer program stored in the storage unit 201 of the communication apparatus 101 and executing this computer program when the communication apparatus 101 establishes the session with the communication apparatus 102.

At least a part of the flowchart illustrated in FIG. 6 may be realized by hardware. In the case where a part of the flowchart illustrated in FIG. 6 is realized by hardware, this can be achieved by, for example, automatically generating a dedicated circuit on an FPGA from a computer program for realizing each step by using a predetermined compiler. Alternatively, the present exemplary embodiment may be configured in such a manner that a part of the flowchart illustrated in FIG. 6 is realized by forming as hardware a gate array circuit in a similar manner to the FPGA. Alternatively, the present exemplary embodiment may be configured in such a manner that a part of the flowchart illustrated in FIG. 6 is realized by an ASIC.

The present flowchart is started according to the communication apparatus 101 starting up the predetermined application to use when carrying out the content redirection. Alternatively, the present flowchart may be started according to the communication apparatus 102 starting playing back the content based on the content redirection or may be started according to the communication apparatus 102 starting receiving the content. Alternatively, the present flowchart may be started according to the communication apparatus 101 transmitting the information related to the content or may be started according to the communication apparatus 101 pausing the mirroring.

First, in step S601, the control unit 202 of the communication apparatus 101 determines whether the session between the communication apparatus 101 and the communication apparatus 102 is disconnected. If determining that the session with the communication apparatus 102 is not disconnected (NO in step S601), the control unit 202 of the communication apparatus 101 makes the determination in step S601 again. On the other hand, if determining that the session between the communication apparatus 101 and the communication apparatus 102 is disconnected (YES in step S601), the control unit 202 of the communication apparatus 101 performs a process of step S602.

In step S602, the control unit 202 of the communication apparatus 101 determines whether the disconnection of the session with the communication apparatus 102 is caused by the normal end processing. The control unit 202 of the communication apparatus 101 makes the determination in a similar manner to the communication apparatus 102 in step S402 illustrated in FIG. 4.

If determining that the disconnection of the session with the communication apparatus 102 is caused by the normal end processing (YES in step S602), the control unit 202 of the communication apparatus 101 performs a process of step S611. On the other hand, if determining that the disconnection of the session with the communication apparatus 102 is not caused by the normal end processing (NO in step S602), the control unit 202 of the communication apparatus 101 performs a process of step S603.

In step S603, the control unit 202 of the communication apparatus 101 displays that the session with the communication apparatus 102 serving as the sink apparatus is disconnected, on the output unit 205 of the communication apparatus 101. The control unit 202 of the communication apparatus 101 may display that the session with the communication apparatus 102 is disconnected based on the input of the user operation for controlling the playback based on the content redirection via the input unit 204 of the communication apparatus 101. One example of a display screen in the present step will be described with reference to FIG. 7, which will be described now.

FIG. 7 illustrates one example of the display screen that the communication apparatus 101 displays when detecting the disconnection of the session with the communication apparatus 102 serving as the sink apparatus. The control unit 202 of the communication apparatus 101 displays a disconnection notification 701 notifying the user that the session with the communication apparatus 102 is disconnected, on the output unit 205. The control unit 202 of the communication apparatus 101 displays the disconnection notification 701 as a pop-up. Alternatively, the control unit 202 of the communication apparatus 101 may perform control so as to constantly display the state of the session with the communication apparatus 102 by using an icon or the like. The control unit 202 of the communication apparatus 101 may perform control so as to, when the session with the communication apparatus 102 is established, display an icon making it understandable, and, when the session with the communication apparatus 102 is disconnected, display another icon making it understandable. Alternatively, the control unit 202 of the communication apparatus 101 may perform control so as to also display a reason why the session is disconnected additionally when the session with the communication apparatus 102 is disconnected. For example, if the session is disconnected due to the disconnection of the wireless communication, the control unit 202 of the communication apparatus 101 may present a display reading "the wireless communication with the sink apparatus is disconnected". The control unit 202 of the communication apparatus 101 may display a device name of the communication apparatus 102 instead of the display "sink apparatus". Further, the control unit 202 of the communication apparatus 101 may present a display reading "the playback of the content that is being played back on the sink apparatus cannot be controlled". Alternatively, the control unit 202 of the communication apparatus 101 may display the reason why the session with the communication apparatus 102 is disconnected, as an error code. The control unit 202 of the communication apparatus 101 may display the device name of the communication apparatus 102 instead of the display "sink apparatus". Alternatively, the communication apparatus 101 may display that the playback of the content that is being played back on the sink apparatus cannot be controlled, along with or instead of the disconnection notification 701.

In step S604, the control unit 202 of the communication apparatus 101 determines whether to try the processing for establishing the session in another communication configuration. The present determination is made based on the state of the communication between the communication apparatus 101 and the communication apparatus 102. More specifically, suppose that the communication apparatus 101 and the communication apparatus 102 perform the processing according to the flowchart illustrated in FIG. 3 and establish the session via, for example, the wireless communication in compliance with the Wi-Fi Direct standard. However, if an error has occurred in the communication between the communication apparatus 101 and the communication apparatus 102 with them kept connected via the wireless communication in compliance with the Wi-Fi Direct standard, the control unit 202 of the communication apparatus 101 determines not to perform the processing for establishing the session with the communication apparatus 102 in the other communication configuration. On the other hand, if the control unit 202 of the communication apparatus 101 detects the disconnection of the wireless communication with the communication apparatus 102, the control unit 202 of the communication apparatus 101 determines to perform the processing for establishing the session with the communication apparatus 102 in the other communication configuration.

Further, suppose that the communication apparatus 101 establishes the session with the communication apparatus 102 via, for example, the wireless communication in compliance with the Wi-Fi Direct standard, but the session with the communication apparatus 102 is disconnected with this wireless communication maintained and an error has occurred. In this case, in step S604, the control unit 202 of the communication apparatus 101 determines not to try the processing for establishing the session in the other communication configuration. However, the control unit 202 of the communication apparatus 101 may determine to try the processing for establishing the session in the other communication configuration when the communication apparatus 101 makes the determination in step S604 again after failing to reestablish the session although performing a process of step S606, which will be described below.

If determining to try the processing for establishing the session with the communication apparatus 102 in the other communication configuration (YES in step S604), the control unit 202 of the communication apparatus 101 performs a process of step S605. On the other hand, if determining not to try the processing for establishing the session with the communication apparatus 102 in the other communication configuration (NO in step S604), the control unit 202 of the communication apparatus 101 performs the process of step S606.

In step S605, the control unit 202 of the communication apparatus 101 tries the processing for establishing the session with the communication apparatus 102 in the other communication configuration. For example, if detecting that the session established with the communication apparatus 102 via the wireless communication in compliance with the Wi-Fi Direct standard is disconnected, the communication apparatus 101 tries to establish the session via the infrastructure network. In the present exemplary embodiment, the communication apparatus 101 is connected to the AP 103, and therefore participates in the infrastructure network constructed by the AP 103. Similarly, in the present exemplary embodiment, the communication apparatus 102 is also connected to the AP 103, and participates in the infrastructure network constructed by the AP 103. Therefore, the control unit 202 of the communication apparatus 101 tires to establish the session with the communication apparatus 102 via the AP 103.

Alternatively, suppose that the communication apparatus 101 is not connected to the AP 103 and the communication apparatus 102 displays the message prompting the user to connect the communication apparatus 101 and the AP 103 to each other. The user connects the communication apparatus 101 to the AP 103 based on the information about the AP 103 displayed by the communication apparatus 102 together with the message. Alternatively, the communication apparatus 101 may receive connection information required to connect to the AP 103 from the communication apparatus 102 before the session with the communication apparatus 102 is disconnected, and connect to the AP 103 with use of the connection information based on the disconnection of the session with the communication apparatus 102. When the communication apparatus 101 connects to the AP 103 in this manner, the control unit 202 of the communication apparatus 101 may notify the user that the communication apparatus 101 will connect to the AP 103, via the output unit 205. More specifically, the communication apparatus 101 may present a display reading "the source apparatus will connect to the access point identified by SSID=XXXX", on the output unit 205. The communication apparatus 101 may use not only the SSID but also any information enabling the user to uniquely identify the AP 103 when indicating the AP 103.

Having described the example in which the communication apparatus 101 establishes the session with the communication apparatus 102 via the infrastructure network, the establishment of the session in the other communication configuration is not limited thereto. The communication apparatus 101 may be configured to try to establish the session with use of another communication method in compliance with the IEEE 802.11 series standards. For example, the communication apparatus 101 may try to establish the session with use of another communication method of the ad-hoc communication, the wireless communication in compliance with the Wi-Fi Aware standard, ASP, or the like.

Regarding the operation when the communication apparatus 101 tries to establish the session with the communication apparatus 102 in the other communication configuration, another example thereof will be described now. The communication apparatus 101 may try to establish the session with the communication apparatus 102 with use of other communication based on Bluetooth or the like, instead of the communication in compliance with the IEEE 802.11 series standards, as the communication configuration. The following description will focus on an example in which the communication apparatus 101 establishes the session using Bluetooth.

Suppose that the communication apparatus 101 and the communication apparatus 102 are each equipped with the communication function capable of carrying out the wireless communication using Bluetooth.

The communication apparatus 101 exchanges the communication capability information between the communication apparatus 101 and the communication apparatus 102 in advance before the session with the communication apparatus 102 is disconnected. The communication capability information contains the information about the communication method that each of the communication apparatus 101 and the communication apparatus 102 supports. The communication apparatus 101 recognizes that the communication using Bluetooth can be carried out between the communication apparatus 101 and the communication apparatus 102 by exchanging the communication capability information with the communication apparatus 102. Similarly, the communication apparatus 102 also recognizes that the communication using Bluetooth can be carried out between the communication apparatus 101 and the communication apparatus 102 by exchanging the communication capability information with the communication apparatus 101.

Suppose that the communication apparatus 101 detects that the session with the communication apparatus 102 is disconnected and the wireless communication between the communication apparatus 101 and the communication apparatus 102 is disconnected. In this case, the communication apparatus 101 starts up Bluetooth, and tries to connect to the communication apparatus 102 with use of Bluetooth. If being connected to the communication apparatus 102 with use of Bluetooth, the communication apparatus 101 tries to establish the session with the communication apparatus 102 via the wireless communication using Bluetooth.

In this case, the control unit 202 of the communication apparatus 101 may display that the session will be established with use of Bluetooth, on the output unit 205 of the communication apparatus 101. More specifically, when detecting the disconnection of the wireless communication with the communication apparatus 102, the communication apparatus 101 may display that the session will be established with use of Bluetooth, in addition to the disconnection notification 701 on the output unit 205 of the communication apparatus 101. Alternatively, the control unit 202 of the communication apparatus 101 may present a display intended to prompt the user to connect the communication apparatus 102 and the communication apparatus 101 to each other with use of Bluetooth. For example, the communication apparatus 101 may present a display reading "please start up Bluetooth of the sink apparatus and attempt the connection" on the output unit 205. Alternatively, the control unit 202 of the communication apparatus 101 may present a display intended to prompt the user to perform a specific operation for connecting the communication apparatus 101 and the communication apparatus 102 to each other with use of Bluetooth. Alternatively, the control unit 202 of the communication apparatus 101 may perform control so as to display, for example, the PIN code information used in the pairing in Bluetooth together therewith.

Suppose that the communication apparatus 101 is a communication apparatus capable of carrying out the wireless communication in compliance with the IEEE 802.11 series standards and the wireless communication using Bluetooth in parallel with each other, and the wireless communication with the communication apparatus 102 is disconnected. In this case, the communication apparatus 101 may wait for the communication apparatus 102 via the communication in compliance with the IEEE 802.11 series standards and establish the session using Bluetooth in parallel.

The above description has focused on the method in which the communication apparatus 101 uses Bluetooth as the other communication configuration different from the wireless communication in compliance with the IEEE 802.11 series standards, but the other communication configuration is not limited thereto and the communication apparatus 101 may use a communication method other than Bluetooth.

Alternatively, the communication apparatus 101 may try to establish the session in another frequency band as the try of the establishment of the session in the other communication configuration. For example, in a case where the communication apparatus 101 has used the 2.4 GHz band as the frequency band before the session is disconnected, the communication apparatus 101 may try to establish the session with use of another frequency band.

When making the determination in step S604, the communication apparatus 101 may make the determination based on the fact that the disconnection and the reconnection of the wireless communication between the communication apparatus 101 and the communication apparatus 102 have occurred a predetermined or greater number of times within a predetermined time period. More specifically, the control unit 202 of the communication apparatus 101 determines YES in step S604 if the disconnection and the reconnection of the wireless communication between the communication apparatus 101 and the communication apparatus 102 have occurred the predetermined or greater number of times within the predetermined time period. On the other hand, the control unit 202 of the communication apparatus 101 determines NO in step S604 if the disconnection and the reconnection of the wireless communication between the communication apparatus 101 and the communication apparatus 102 have not occurred the predetermined or greater number of times within the predetermined time period. For example, in the case where the communication apparatus 101 and the communication apparatus 102 carry out the wireless communication with use of the frequency band of the 2.4 GHz band under an indoor environment, the wireless communication between the communication apparatus 101 and the communication apparatus 102 may be frequently disconnected by being affected by a microwave or the like. In such a case, the communication is disconnected and reconnected between the communication apparatus 101 and the communication apparatus 102 the predetermined or greater number of times within the predetermined time period, so that the communication apparatus 101 may be configured to try to establish the session via wireless communication in another frequency band such as the 5 GHz band.

The communication apparatus 101 may be configured to make the determination in step S604 based on a user's selection. More specifically, the control unit 202 of the communication apparatus 101 displays an inquiry screen inquiring of the user whether to reestablish the session in the other communication configuration, on the output unit 205. The user selects whether to reestablish the session in the other communication configuration by inputting a user operation via the input unit 204 of the communication apparatus 101. If the user selects reestablishing the session in the other communication configuration, the control unit 202 of the communication apparatus 101 determines YES in step S604. On the other hand, if the user selects not reestablishing the session in the other communication configuration, the control unit 202 of the communication apparatus 101 determines NO in step S604. The control unit 202 of the communication apparatus 101 may operate so as to display all or a part of the communication configurations possible to be employed as the other communication configuration on the inquiry screen, thereby enabling the user to select the communication configuration to reestablish the session.

If determining not to try to establish the session with the communication apparatus 102 in the other communication configuration (NO in step S604), in step S606, the control unit 202 of the communication apparatus 101 tries to reestablish the session with the communication apparatus 102 in the current communication configuration.

In step S607, the control unit 202 of the communication apparatus 101 determines whether the session with the communication apparatus 102 is reestablished. If determining that the session with the communication apparatus 102 cannot be reestablished (NO in step S607), the control unit 202 of the communication apparatus 101 performs the process of step S604. On the other hand, if determining that the session with the communication apparatus 102 can be reestablished (YES in step S607), the control unit 202 of the communication apparatus 101 performs a process of step S608. The control unit 202 of the communication apparatus 101 may operate so as to end the try as an error and stop the content redirection if a predetermined time period has elapsed with the communication apparatus 101 keeping failing to reestablish the session with the communication apparatus 102. Alternatively, the control unit 202 of the communication apparatus 101 may operate so as to end the try as an error and stop the content redirection if trying to reestablish the session with the communication apparatus 102 a predetermined or greater number of times.

When the session with the communication apparatus 102 is reestablished, the control unit 202 of the communication apparatus 101 becomes able to transmit the playback control information about the content that is being played back on the communication apparatus 102 to the communication apparatus 102. Upon receiving the user operation for controlling the playback of the content, the control unit 202 of the communication apparatus 101 transmits the playback control information to the communication apparatus 102 via the reestablished session.

Further, upon reestablishing the session with the communication apparatus 102, the control unit 202 of the communication apparatus 101 receives the information about the state of the content redirection from the communication apparatus 102. More specifically, the control unit 202 of the communication apparatus 101 receives the notification about the state of the content redirection from the communication apparatus 102. The state of the content redirection refers to the state such as whether the communication apparatus 102 is carrying out the content redirection or the content redirection is stopped on the communication apparatus 102. If the content redirection is stopped on the communication apparatus 102 due to occurrence of some error before the session with the communication apparatus 101 is reestablished, the communication apparatus 101 receives the notification about it from the communication apparatus 102. In this case, the communication apparatus 101 may receive not only the state of the content redirection but also the content and the cause of the error that has occurred, from the communication apparatus 102. The control unit 202 of the communication apparatus 101 receives the information indicating such a state of the content redirection from the communication apparatus 102. More specifically, the control unit 202 of the communication apparatus 101 receives the state of the content redirection from the communication apparatus 102 with use of an RTSP message. The method for the reception is not limited thereto, and the communication apparatus 101 may employ any method as long as being able to receive the state of the content redirection from the communication apparatus 102.

Alternatively, the control unit 202 of the communication apparatus 101 may transmit an inquiry signal inquiring of the communication apparatus 102 about the state of the content redirection when reestablishing the session with the communication apparatus 102. The communication apparatus 102 may transmit a notification signal notifying the communication apparatus 101 of the state of the content redirection to the communication apparatus 101 as a response to the inquiry signal.

In step S608, the control unit 202 of the communication apparatus 101 determines whether the communication apparatus 102 serving as the sink apparatus is carrying out the content redirection based on the state of the content redirection received from the communication apparatus 102. If the state of the content redirection that has been received from the communication apparatus 102 indicates that the content redirection is stopped on the communication apparatus 102, the control unit 202 of the communication apparatus 101 determines that the communication apparatus 102 is not carrying out the content redirection. If determining that the communication apparatus 102 is not carrying out the content redirection (NO in step S608), the control unit 202 of the communication apparatus 101 performs a process of step S609. On the other hand, if the state of the content redirection that has been received from the communication apparatus 102 indicates that the communication apparatus 102 is carrying out the content redirection, the control unit 202 of the communication apparatus 101 determines YES in step S608. If determining that the communication apparatus 102 is carrying out the content redirection (YES in step S608), the control unit 202 of the communication apparatus 101 performs a process of step S610.

In step S609, the control unit 202 of the communication apparatus 101 performs restart processing for restarting the content redirection on the communication apparatus 102. As the restart processing, the control unit 202 of the communication apparatus 101 transmits the restart instruction message instructing the communication apparatus 102 to restart the content redirection to the communication apparatus 102.

In step S610, the control unit 202 of the communication apparatus 101 displays that the session with the communication apparatus 102 is reestablished, on the output unit 205 of the communication apparatus 101. Due to this display, the user can be aware that he/she has become able to control the playback based on the content redirection with use of the source apparatus by confirming the display on the communication apparatus 101 serving as the source apparatus. The communication apparatus 102 may also display that the session between the communication apparatus 101 and the communication apparatus 102 is reestablished, on the output unit 205 of the communication apparatus 102. After performing the process of step S610, the control unit 202 of the communication apparatus 101 performs the process of step S601.

Further, if determining YES in step S602, in step S611, the control unit 202 of the communication apparatus 101 displays that the content redirection is ended, on the output unit 205 of the communication apparatus 101. After performing the process of step S611, the control unit 202 of the communication apparatus 101 ends the flow according to the present flowchart.

In this manner, in FIG. 6, when the session between the communication apparatus 101 and the communication apparatus 102 is disconnected, the communication apparatus 101 notifies the user that the session between the communication apparatus 101 and the communication apparatus 102 is disconnected by displaying it. As a result, the user can be aware that he/she becomes unable to perform the control of the playback based on the content redirection via the communication apparatus 101.

Further, the control unit 202 of the communication apparatus 101 can also be configured to, when the session with the communication apparatus 102 is disconnected and the user operation for instructing the communication apparatus 101 to control the playback based on the content redirection is input from the user, notify the user of it. For example, even if the user is notified that the session with the communication apparatus 102 is disconnected when engaging in another task such as generating an e-mail with use of the communication apparatus 101, this means that the user receives a notification irrelevant to the task that he/she is currently engaging in, so that the user feels annoyed. However, the user can acquire necessary information when necessary by being notified that the session with the communication apparatus 102 is disconnected when inputting the user operation for instructing the communication apparatus 101 to control the playback based on the content redirection.

The disconnection of the session between the communication apparatus 101 and the communication apparatus 102 may be displayed by both the communication apparatus 101 and the communication apparatus 102 or may be displayed by only any one of them. More specifically, the intended effect can be satisfied by performing at least any one of the process of step S603 illustrated in FIG. 6 by the communication apparatus 101 and the process of step S404 illustrated in FIG. 4 by the communication apparatus 102. Regarding the reestablishment of the session between the communication apparatus 101 and the communication apparatus 102, the intended effect can also be satisfied similarly by displaying it by at least one of the communication apparatus 101 and the communication apparatus 102. Further, regarding the display about the end of the content redirection on the communication apparatus 102, the intended effect can also be satisfied by displaying it by at least one of the communication apparatus 101 and the communication apparatus 102.

The communication apparatus 102 displays that the session with the communication apparatus 101 is disconnected in step S404 illustrated in FIG. 4, but, instead thereof, may be modified so as to present the display when the reestablishment of the session with the communication apparatus 101 (step S405 to step S407) has failed. More specifically, the control unit 202 of the communication apparatus 102 may perform the processing in the following manner. After performing the process of step S403, the control unit 202 of the communication apparatus 102 skips step S404 and performs the process of step S405. Then, if determining NO in step S409, the control unit 202 of the communication apparatus 102 performs the process of step S404, thereby displaying that the session with the communication apparatus 101 is disconnected. The control unit 202 of the communication apparatus 102 may display that the session with the communication apparatus 101 is disconnected when keeping failing to reestablish the session although trying to reestablish the session with the communication apparatus 101 a predetermined number of times. Similarly, the control unit 202 of the communication apparatus 101 may also perform the process of step S602 illustrated in FIG. 6 and present the display after trying to reestablish the session with the communication apparatus 102.

Further, the communication apparatus 102 may determine whether to perform the process of step S404 illustrated in FIG. 4 after detecting the disconnection of the session or to perform the process of step S404 illustrated in FIG. 4 after reestablishing the session, based on the cause for the disconnection of the session. For example, if the cause for the disconnection of the session between the communication apparatus 101 and the communication apparatus 102 is a disconnection at a wireless LAN link level, the communication apparatus 102 performs the process of step S404 after trying to reestablish the session. On the other hand, if the communication apparatus 101 and the communication apparatus 102 are kept connected to each other at the wireless LAN link level but the session is disconnected, the communication apparatus 102 performs the process of step S404 according to detecting the disconnection of the session. The execution of step S404 is not limited thereto, and the communication apparatus 102 performs the process of step S404 after trying to reestablish the session if the reestablishment of the session is highly likely to succeed. On the other hand, the communication apparatus 102 performs the process of step S404 according to detecting the disconnection of the session if the reestablishment of the session is expected not to be easy. In what kind of case the communication apparatus 102 performs the process of step S404 is preset to the communication apparatus 102. Alternatively, this may be determined by the application used to enable the communication apparatus 102 to carry out the content redirection or may be set by the user.

In the present exemplary embodiment, the communication apparatus 102 determines whether the disconnection of the session with the communication apparatus 101 serving as the source apparatus is detected. However, the determination about the detection of the disconnection is not limited thereto, and the communication apparatus 102 may determine whether the disconnection of the wireless communication with the communication apparatus 101 is detected. More specifically, in step S401 illustrated in FIG. 4, the communication apparatus 102 determines whether the wireless communication with the source apparatus is disconnected. For example, suppose that the communication apparatus 101 and the communication apparatus 102 operate as the GO and the CL of the wireless communication in compliance with the Wi-Fi Direct standard, respectively. The control unit 202 of the communication apparatus 102 determines that the disconnection of the wireless communication is detected if detecting a loss of a beacon transmitted from the GO (the communication apparatus 101). Alternatively, suppose that the communication apparatus 101 and the communication apparatus 102 operate as the CL and the GO of the wireless communication in compliance with the Wi-Fi Direct standard, respectively. The control unit 202 of the communication apparatus 102 determines that the disconnection of the wireless communication is detected if not receiving a frame of the wireless LAN layer from the communication apparatus 101 for a predetermined time period. If determining that the wireless communication with the source apparatus is disconnected, the communication apparatus 102 continues the content redirection.

Regarding the wireless communication between the communication apparatus 101 and the communication apparatus 102, the communication apparatus 101 and the communication apparatus 102 may confirm whether the wireless communication is valid and manage the wireless communication by transmitting and receiving, for example, the keepalive request and the keepalive response with respect to the wireless communication within a predetermined period, similar to the session.

The communication apparatus 102 may determine whether the disconnection of the wireless communication with the source apparatus is caused by the normal end processing, before continuing the content redirection. This determination is made in a similar manner to step S402 illustrated in FIG. 4. While continuing the content redirection, the communication apparatus 102 displays that the wireless communication with the source apparatus is disconnected. Then, the communication apparatus 102 determines whether to wirelessly communicate with the source apparatus with use of another communication method. This determination is made in a similar manner to step S405 illustrated in FIG. 4.

If determining to wirelessly communicate with the source apparatus with use of the other communication method, the communication apparatus 102 tries the wireless communication with use of the other communication method. On the other hand, if determining not to wirelessly communicate with the source apparatus with use of the other communication method, the communication apparatus 102 tries the wireless communication with use of the same wireless communication method as the disconnected wireless communication. The communication apparatus 102 determines whether the wireless communication with the source apparatus can be carried out, and, if the wireless communication cannot be carried out, determines whether to wirelessly communicate with the source apparatus with use of another communication method. On the other hand, if the wireless communication with the source apparatus can be carried out, the communication apparatus 102 displays it. In this case, the communication apparatus 102 may notify the source apparatus of the state of the content redirection.

When determining whether the disconnection of the wireless communication with the source apparatus is detected, the communication apparatus 102 may determine whether the session with the source apparatus is disconnected together with this determination. The communication apparatus 102 does not notify the user if the session is prevented from being disconnected by wirelessly communicating with the source apparatus with use of the other communication method, even when the wireless communication with the source apparatus is disconnected. Alternatively, the communication apparatus 102 may notify the user that the wireless communication is carried out with the source apparatus with use of the other communication method.

The communication apparatus 101 may also notify the user based on the disconnection of the wireless communication with the sink apparatus instead of the disconnection of the session with the sink apparatus, similar to the communication apparatus 102.

Each of the communication apparatus 101 and the communication apparatus 102 may determine whether a path of the communication with the communication apparatus 102 or the communication apparatus 101 is disconnected. The path of the communication with the communication apparatus 101 or the communication apparatus 102 refers to at least one of the wireless communication and the session between the communication apparatus 101 and the communication apparatus 102.

The control unit 202 of the communication apparatus 102 may switch the content of the notification based on whether the session with the communication apparatus 101 is disconnected or the wireless communication with the communication apparatus 101 is disconnected. More specifically, the control unit 202 of the communication apparatus 102 notifies the user that the session with the communication apparatus 101 is disconnected, in step S404 illustrated in FIG. 4 if the session with communication apparatus 101 is disconnected. Alternatively, the control unit 202 of the communication apparatus 102 may issue a notification prompting the user to reestablish the session with the communication apparatus 101 instead of or in addition to indicating the disconnection of the session. On the other hand, the control unit 202 of the communication apparatus 102 notifies the user that the wireless communication with the communication apparatus 101 is disconnected, in step S404 illustrated in FIG. 4 if the wireless communication with communication apparatus 101 is disconnected. Alternatively, the control unit 202 of the communication apparatus 102 may issue a notification prompting the user to reestablish the wireless communication with the communication apparatus 101 instead of or in addition to indicating the disconnection of the wireless communication with the communication apparatus 101. Alternatively, the control unit 202 of the communication apparatus 102 may switch the notification among when the path of the communication with the communication apparatus 101 is maintained, when the session is disconnected, and when the wireless communication is disconnected in the case where the control unit 202 of the communication apparatus 102 constantly notifies the user of the state of the communication with the communication apparatus 101 with use of an icon or the like.

Further, in the present exemplary embodiment, the control unit 202 of the communication apparatus 102 notifies the user that the communication path is disconnected, via the output unit 205 of the communication apparatus 102 when detecting that the path of the communication with the communication apparatus 101 is disconnected. However, this notification is not limited thereto, and the control unit 202 of the communication apparatus 102 may notify the user that the path of the communication with the communication apparatus 101 is disconnected, via another apparatus different from the communication apparatus 101. Now, the other apparatus refers to an apparatus connected to the communication apparatus 102 via wireless communication or wired communication, and an apparatus equipped with an output unit such as a monitor screen and a speaker. Upon detecting the disconnection of the path of the communication with the communication apparatus 101, the communication apparatus 102 notifies the user thereof by presenting a display like the example described in the description of step S404 illustrated in FIG. 4 on the other apparatus. Alternatively, both the communication apparatus 102 and the other apparatus may present the display like the example presented in step S404 illustrated in FIG. 4. Similarly, the control unit 202 of the communication apparatus 101 may also cause another apparatus connected to the communication apparatus 101 via wireless communication or wired communication to present a display like the example described in the description of step S603 illustrated in FIG. 6. Alternatively, both the communication apparatus 101 and the other apparatus may present the display like the example presented in step S603 illustrated in FIG. 6.

Further, in the present exemplary embodiment, the communication apparatus 102 displays that the session or the wireless communication with the communication apparatus 101 is disconnected, on the monitor screen prepared as the output unit 205. However, the output of the notification is not limited thereto, and, in the case where the communication apparatus 102 is equipped with the speaker as the output unit 205, the communication apparatus 102 may notify the user that the session or the wireless communication with the communication apparatus 101 is disconnected by issuing a specific sound via this speaker. Alternatively, in a case where the communication apparatus 102 is equipped with a light source such as a light emitting diode (LED) light as the output unit 205, the communication apparatus 102 may notify the user that the session or the wireless communication with the communication apparatus 101 is disconnected by, for example, causing this light source to blink or light up with a specific color. Alternatively, the communication apparatus 102 may notify the user by combining them. The communication apparatus 101 may also notify the user that the wireless communication or the session with the communication apparatus 102 is disconnected, with use of a similar method.

In the present exemplary embodiment, the communication apparatus 101 transmits both the information related to the content and the playback control information to the communication apparatus 102, but the present processing is not limited thereto and the communication apparatus that transmits the information related to the content and the communication apparatus that transmits the playback control information may be different communication apparatuses from each other. In this case, when the communication apparatus 102 detects the disconnection of the path of the communication with the communication apparatus that transmits the playback control information, the communication unit of the communication apparatus 102 notifies the user of the disconnection of the communication path. Alternatively, the communication unit of the communication apparatus that transmits the playback control information may notify the user instead of or in addition to the communication apparatus 102. The communication unit of the communication apparatus that transmits the information related to the content may notify the user of the disconnection of the path of the communication between the communication apparatus 102 and the communication apparatus that transmits the playback control information.

The control unit 202 of the communication apparatus 102 preforms the processing for disconnecting the path of the communication with the communication apparatus 101 when receiving, for example, the message indicating the end of the content redirection from the communication apparatus 101. Then, the control unit 202 of the communication apparatus 102 determines that the disconnection of the path of the communication with the communication apparatus 101 is detected. However, the determination of the detection of the disconnection is not limited thereto, and the control unit 202 of the communication apparatus 102 may determine that the disconnection of the path of the communication with the communication apparatus 101 is detected, based on receiving or transmitting a message serving as a trigger of the execution of the processing for disconnecting the path of the communication with the communication apparatus 101. The message serving as the trigger of the execution of the processing for disconnecting the path of the communication with the communication apparatus 101 refers to, for example, a message indicating the end of the content redirection. Further, the control unit 202 of the communication apparatus 102 performs the processing for disconnecting the path of the communication with the communication apparatus 101 based on the issue of the instruction to end the content redirection from the user, and determines that the disconnection of the communication path is detected based on the disconnection of the communication path. However, similarly in this case, the control unit 202 of the communication apparatus 102 may also determine that the disconnection of the communication path is detected based on the issue of the instruction to end the content redirection. The same also applies to when the control unit 202 of the communication apparatus 102 transmits and receives the confirmation request signal for confirming whether the communication path is valid and the confirmation response signal, with the communication apparatus 101. More specifically, the control unit 202 of the communication apparatus 102 performs the processing for disconnecting the path of the communication with the communication apparatus 101 based on the fact that the confirmation request signal or the confirmation response signal is not received within a predetermined time period, and then determines that the disconnection of the communication path is detected. Alternatively, the control unit 202 of the communication apparatus 102 may determine that the disconnection of the communication path is detected, based on the fact that the confirmation request signal or the confirmation response signal is not received within the predetermined time period.

At least a part or all of the flowcharts of the communication apparatus 101 and the communication apparatus 102 illustrated in FIGS. 3, 4, and 6 may be realized by hardware. In the case where these flowcharts are realized by hardware, this can be achieved by, for example, generating a dedicated circuit on an FPGA from a computer program for realizing each step by using a predetermined compiler, and utilizing it. Alternatively, the present exemplary embodiment may be configured in such a manner that these flowcharts are realized by forming as hardware a gate array circuit in a similar manner to the FPGA. Alternatively, the present exemplary embodiment may be configured in such a manner that these flowcharts are realized by an ASIC.

Further, the present exemplary embodiment may be configured in such a manner that the individual steps in the flowcharts illustrated in FIGS. 3, 4, and 6 are performed while being distributed to a not-illustrated plurality of CPUs or apparatuses. In the case where the steps are performed while being distributed to the plurality of apparatuses, source apparatuses operate as a source system and sink apparatuses operate as a synchronization system.

Having described the exemplary embodiment in detail, various embodiments of the present disclosure can be embodied as, for example, a system, an apparatus, a method, a program, or a recording medium (a storage medium). More specifically, embodiments of the present disclosure may be applied to a system including a plurality of devices (for example, a host computer, an interface device, an imaging device, a web application, and the like), or may also be applied to an apparatus including one device.

Various embodiments of the present disclosure can also be realized by processing that supplies a program capable of achieving one or more functions of the above-described exemplary embodiment to a system or an apparatus via a network or a storage medium, and causes one or more processors in a computer of this system or apparatus to read out and execute the program. Further, various embodiments of the present disclosure can also be realized by a circuit (for example, an ASIC) capable of achieving one or more functions.

According to various embodiments of the present disclosure, a communication apparatus configured to receive the playback control information from another communication apparatus via a communication path can improve the convenience of the user by performing control in such a manner that a notification based on a disconnection of the communication path can be issued to the user upon detecting the disconnection of the communication path.

Other Embodiments

Embodiment(s) of the present disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing units (CPUs), micro processing units (MPUs)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-056801, filed Mar. 23, 2018, which is hereby incorporated by reference herein in its entirety.

What is claimed is:
1. A communication apparatus comprising:
one or more processors; and
one or more memories including instructions that, when executed by the one or more processors, cause the communication apparatus to:

receive, from a first other communication apparatus, an identifier for identifying content held by an external apparatus;
acquire the content from the external apparatus based on the received identifier;
play back the acquired content;
receive playback control information for controlling the playback of the acquired content from the first other communication apparatus via a communication path between the communication apparatus and the first other communication apparatus in a case where the acquired content is being played back;
detect a disconnection of the communication path in a case where the acquired content is being played back; and
perform control in such a manner that a notification based on the disconnection of the communication path is issued to a user based on the detection of the disconnection of the communication path,
wherein the acquired content is continued to be played back while the notification based on the disconnection of the communication path is being issued to a user.

2. The communication apparatus according to claim 1, wherein the execution of the instructions further causes the communication apparatus to:
receive a user operation; and
switch whether the communication apparatus performs control in a case where the communication path is disconnected and the playback of the acquired content is continued even after the communication path is disconnected,
wherein the communication apparatus carries out the switching in such a manner that the communication apparatus performs control if the communication apparatus does not have a playback control function, and the communication apparatus does not perform the control if the communication apparatus has the playback control function, and
wherein the playback control function is a function for controlling the playback of the acquired content based on the user operation in a case where the communication apparatus is powered on.

3. The communication apparatus according to claim 1, wherein the execution of the instructions further causes the communication apparatus to:
receive an end instruction instructing the communication apparatus to end the playback of the acquired content; and
switch whether the communication apparatus performs control based on whether the end instruction is received in a case where the disconnection of the communication path is detected,
wherein the communication apparatus carries out the switching in such a manner that the communication apparatus does not perform control if the disconnection is detected after the end instruction is received, and the communication apparatus performs the control if the disconnection is detected without the end instruction received.

4. The communication apparatus according to claim 1, wherein the execution of the instructions further causes the communication apparatus to:
reestablish the communication path in a case where the disconnection of the communication path is detected, wherein the playback control information is received from the first other communication apparatus via the reestablished communication path in a case where the communication path is reestablished.

5. The communication apparatus according to claim 1, wherein the execution of the instructions further causes the communication apparatus to:
communicate with the first other communication apparatus via first wireless communication; and
establish a session with the first other communication apparatus via the first wireless communication,
wherein the communication apparatus detects at least one of disconnection of the first wireless communication and disconnection of the session as the disconnection of the communication path.

6. The communication apparatus according to claim 5, wherein the communication apparatus performs control so as to issue a different notification to the user between in a case where the disconnection of the session is detected as the disconnection of the communication path and in a case where the disconnection of the first wireless communication is detected as the disconnection of the communication path.

7. The communication apparatus according to claim 5, wherein the first wireless communication is wireless communication in compliance with the Institute of Electrical and Electronics Engineers (IEEE) 802.11 series standards.

8. The communication apparatus according to claim 5, wherein the first wireless communication is wireless communication in compliance with the Wireless Fidelity (Wi-Fi) Direct standard.

9. The communication apparatus according to claim 5, wherein the first wireless communication is wireless communication via an infrastructure network.

10. The communication apparatus according to claim 1, wherein the communication apparatus performs control so as to issue a notification indicating that the playback control information cannot be received from the first other communication apparatus based on the detection of the disconnection of the communication path.

11. The communication apparatus according to claim 1, wherein the communication apparatus performs control so as to display the notification to the user while superimposing the notification on the acquired content that is being played back.

12. The communication apparatus according to claim 1, wherein the communication apparatus performs control so as to notify the user by displaying an icon.

13. The communication apparatus according to claim 1, wherein the communication apparatus performs control so as to notify the user by switching a screen displayed on a display between a first screen that is displayed in a case where the disconnection of the communication path is detected and a second screen that is displayed in a case where the disconnection of the communication path is not detected.

14. The communication apparatus according to claim 1, wherein the execution of the instructions further causes the communication apparatus to:
receive a confirmation request for confirming whether the communication path is maintained, from the first other communication apparatus, wherein the communication apparatus performs control if the disconnection of the communication path is detected without the confirmation request received from the first other communication apparatus until a first predetermined time period has elapsed.

15. The communication apparatus according to claim 1, wherein the execution of the instructions further causes the communication apparatus to:

transmit a confirmation request for confirming whether the communication path is maintained, to the first other communication apparatus; and receive a confirmation response, which is a response to the confirmation request, from the first other communication apparatus, wherein the communication apparatus performs control if the disconnection of the communication path is detected without the confirmation response received from the first other communication apparatus until a second predetermined time period has elapsed after the confirmation request is transmitted to the first other communication apparatus.

16. The communication apparatus according to claim 1, further comprising:

a communication unit, wherein the communication apparatus issues the notification based on the disconnection of the communication path, to the user, by controlling the communication unit.

17. The communication apparatus according to claim 1, wherein the communication apparatus issues the notification based on the disconnection of the communication path, to the user, by controlling a communication unit that a second other communication apparatus different from the first other communication apparatus has.

18. The communication apparatus according to claim 1, wherein the communication apparatus is a communication apparatus that operates in compliance with the Wi-Fi Miracast standard.

19. A method for controlling a communication apparatus, the method comprising:

receiving, from a first other communication apparatus, an identifier for identifying content held by an external apparatus, as first receiving;

acquiring the content from the external apparatus based on the received identifier received by the first receiving;

playing back the acquired content by the acquiring;

receiving playback control information for controlling the playback of the acquired content from the first other communication apparatus via a communication path between the communication apparatus and the first other communication apparatus in a case where the acquired content is being played back by the playing back, as second receiving;

detecting a disconnection of the communication path in a case where the acquired content is being played back by the playing back; and performing control in such a manner that a notification based on the disconnection of the communication path is issued to a user based on the detection of the disconnection of the communication path by the detecting, wherein the acquired content is continued to be played back while the notification based on the disconnection of the communication path is being issued to a user.

20. A non-transitory computer-readable recording medium recording a program for causing a computer to function as each unit of a communication apparatus, the program comprising:

receiving, from a first other communication apparatus, an identifier for identifying content held by an external apparatus, as first receiving;

acquiring the content from the external apparatus based on the received identifier received by the first receiving;

playing back the acquired content by the acquiring;

receiving playback control information for controlling the playback of the acquired content from the first other communication apparatus via a communication path between the communication apparatus and the first other communication apparatus in a case where the acquired content is being played back by the playing back, as second receiving;

detecting a disconnection of the communication path in a case where the acquired content is being played back by the playing back; and performing control in such a manner that a notification based on the disconnection of the communication path is issued to a user based on the detection of the disconnection of the communication path by the detecting, wherein the acquired content is continued to be played back while the notification based on the disconnection of the communication path is being issued to a user.

* * * * *